(12) United States Patent  (10) Patent No.: US 8,553,516 B2
Miura et al.  (45) Date of Patent: Oct. 8, 2013

(54) REPRODUCING DEVICE AND OPTICAL PATH LENGTH SERVO CONTROL METHOD

(75) Inventors: Takahiro Miura, Kanagawa (JP); Yojiro Sumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 216 days.

(21) Appl. No.: 13/233,269

(22) Filed: Sep. 15, 2011

(65) Prior Publication Data

US 2012/0069722 A1  Mar. 22, 2012

(30) Foreign Application Priority Data

Sep. 22, 2010  (JP) .................................. 2010-211896

(51) Int. Cl.
G11B 7/00  (2006.01)
(52) U.S. Cl.
USPC ..................................................... 369/112.01
(58) Field of Classification Search
None
See application file for complete search history.

(56) References Cited

U.S. PATENT DOCUMENTS

| 5,214,633 A | * | 5/1993 | Tanno et al. ............. 369/112.27 |
| 8,432,781 B2 | * | 4/2013 | Knappmann et al. .... 369/112.03 |
| 2008/0205257 A1 | | 8/2008 | Yamatsu et al. |
| 2012/0257488 A1 | * | 10/2012 | Knappmann et al. .... 369/112.03 |

FOREIGN PATENT DOCUMENTS

| JP | 2008-135144 A | 6/2008 |
| JP | 2008-176902 A | 7/2008 |
| JP | 2008-243273 A | 10/2008 |
| JP | 2008-269680 A | 11/2008 |

* cited by examiner

*Primary Examiner* — Joseph Feild
*Assistant Examiner* — Parul Gupta
(74) *Attorney, Agent, or Firm* — Wolf, Greenfield & Sacks, P.C.

(57) ABSTRACT

A reproducing device includes a homodyne detection part that carries out homodyne detection by using reflected light of first light obtained from a recording layer as signal light and using reflected light of second light by a mirror as reference light, a signal reproducing part that obtains a reproduced signal based on the signal light, based on a result of homodyne detection, and a one-axis actuator that drives the mirror. The reproducing device further includes an optical path length servo control part that carries out driving control of the one-axis actuator in such a manner that the optical path length difference between the signal light and the reference light is kept constant, and an offset giving part that gives an offset that reduces or enlarges the amplitude difference of the reproduced signal of marks that are recorded in the recording layer and have sizes different from each other.

10 Claims, 20 Drawing Sheets

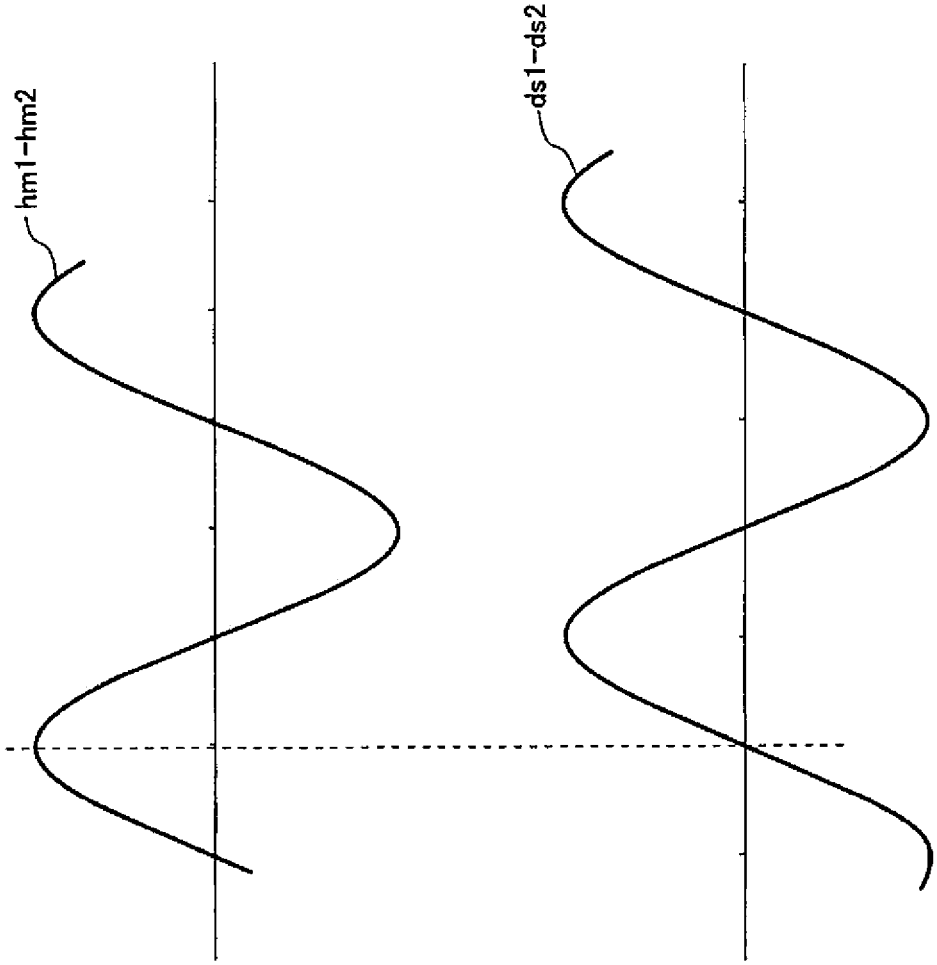

CODE "1"

CODE "0"

INTERFERENCE WITH REF_0°

INTERFERENCE WITH REF_180°

HOMODYNE MEASUREMENT AXIS BY OPTICAL PATH LENGTH SERVO

HOMODYNE MEASUREMENT AXIS BY OPTICAL PATH LENGTH SERVO

REPRODUCING DEVICE AND OPTICAL PATH LENGTH SERVO CONTROL METHOD

BACKGROUND

The present disclosure relates to a reproducing device that carries out signal reproduction by so-called homodyne detection and an optical path length servo control method thereof.

As an optical recording medium to/from a signal is recorded/reproduced by light irradiation, so-called optical discs such as compact disc (CD), digital versatile disc (DVD), and Blu-ray Disc (registered trademark, BD) have been spread.

Regarding the optical recording medium that should be responsible for the next generation of the optical recording media that have been spread currently, such as CD, DVD, and BD, the present assignee has proposed an optical recording medium of a so-called bulk recording type like those described in Japanese Patent Laid-Open No. 2008-135144 and Japanese Patent Laid-Open No. 2008-176902 (hereinafter, Patent Document 1 and Patent Document 2, respectively).

The bulk recording refers to a technique for increase in the recording capacity. Specifically, for example as shown in FIG. 16, an optical recording medium (bulk recording medium 100) having at least a cover layer 101 and a bulk layer (recording layer) 102 is irradiated with laser light with sequential change of the focal position, to thereby perform multilayer recording in the bulk layer 102.

Regarding the bulk recording, a recording technique referred to as a so-called micro-hologram system is disclosed in Patent Document 1.

In this micro-hologram system, a so-called hologram recording material is used as the recording material of the bulk layer 102. As the hologram recording material, e.g. a photopolymerized photopolymer is widely known.

The micro-hologram system is classified roughly into a positive micro-hologram system and a negative micro-hologram system.

The positive micro-hologram system is a technique in which two opposing beams (beams A and B) are collected to the same position to form a minute interference pattern (hologram) and this interference pattern is used as the recorded mark.

The negative micro-hologram system is based on the opposite idea of the positive micro-hologram system and is a technique in which an interference pattern formed in advance is erased by laser light irradiation and this erased part is used as the recorded mark. In this negative micro-hologram system, initialization treatment for forming an interference pattern for the bulk layer 102 in advance is performed before recording operation. Specifically, as this initialization treatment, beams of collimated light are emitted opposed to each other and an interference pattern of them is formed in the whole of the bulk layer 102.

After the interference pattern is formed in advance by the initialization treatment in this manner, information recording by forming of the erasure mark is performed. Specifically, laser light irradiation in association with recording information is performed with focus on an arbitrary layer position to thereby perform information recording based on the erasure mark.

The present assignee has proposed also a recording technique in which a void (vacancy, hole) is formed as the recorded mark like that disclosed in Patent Document 2 as a bulk recording technique different from the micro-hologram system.

The void recording system is a technique in which the bulk layer 102 composed of a recording material such as a photopolymerized photopolymer is irradiated with laser light with comparatively high power to record a vacancy (void) in the bulk layer 102. As described in Patent Document 2, the vacancy part thus formed has a refractive index different from that of other part in the bulk layer 102 and the optical reflectance is enhanced at the boundary of these parts. Therefore, this vacancy part functions as the recorded mark. This realizes information recording by forming of the vacancy mark.

In such a void recording system, the hologram is not formed and thus light irradiation from one side is sufficient for recording. That is, there is no need to collect two beams to the same position for forming the recorded mark differently from the positive micro-hologram system.

Furthermore, compared with the negative micro-hologram system, the void recording system has a merit that the initialization treatment is unnecessary.

Although an example in which irradiation with pre-cure light before recording is performed for the void recording is shown in Patent Document 2, void recording is possible also when the irradiation with pre-cure light is omitted.

In the optical disc recording medium of the bulk recording type (referred to also as bulk type simply), for which the above-described various kinds of recording techniques have been proposed, the recording layer (bulk layer) of such optical disc recoding medium of the bulk recording type does not have an explicit multilayer structure defined in the sense that plural reflection films are formed for example. That is, in the bulk layer 102, reflection film and guide groove for each recording layer, like those included in a normal multilayer disc, are not provided.

Therefore, in the case of the structure of the bulk recording medium 100 shown in FIG. 16, focus servo control and tracking servo control cannot be carried out in recording at the timing when a mark has not yet been formed.

Therefore, in practice, the bulk recoding medium 100 is provided with a reflection surface (reference surface) that has a guide groove like that shown in FIG. 17 and serves as the basis.

Specifically, the guide groove (position guide element) obtained by forming e.g. pit and groove is formed into the form of a spiral or concentric circles on the lower surface side of the cover layer 101 and a selective reflection film 103 is deposited on the guide groove. On the lower layer side of the cover layer 101 on which the selective reflection film 103 is thus deposited, the bulk layer 102 is stacked with the intermediary of a bonding material such as a UV (ultraviolet)-curable resin as an intermediate layer 104 in the diagram.

By the forming of the above-described guide groove based on pit, groove, and so forth, absolute position information (address information) such as radial position information and rotation angle information is recorded. Hereinafter, the surface in which such a guide groove is formed and the absolute position information is recorded (in this case, the surface on which the selective reflection film 103 is formed) will be referred to as "reference surface Ref."

As shown in FIG. 18, the bulk recording medium 100 having the above-described medium structure is irradiated with servo laser light (referred to also as servo light simply) as laser light for position control separately from laser light for mark recording (or reproducing) (hereinafter, referred to also as recording/reproducing laser light or as recording/reproducing light simply).

As shown in the diagram, the recording/reproducing laser light and the servo laser light are irradiated onto the bulk recording medium 100 via a common objective lens.

At this time, if the servo laser light reaches the bulk layer 102, possibly mark recording in this bulk layer 102 is adversely affected. Therefore, in the bulk recording system of the related art, laser light in a wavelength band different from that of the recording/reproducing laser light is used as the servo laser light. In addition, as the reflection film formed on the reference surface Ref, the selective reflection film 103 having such wavelength selectivity as to reflect the servo laser light and transmit the recording/reproducing laser light is provided.

Based on the above-described premise, operation in mark recording in the bulk recording medium 100 will be described below with reference to FIG. 18.

First, when multilayer recording is performed with the bulk layer 102 in which guide groove and reflection film are not formed, which position is employed as the layer position at which a mark is recorded in the depth direction of the bulk layer 102 is decided in advance. FIG. 18 exemplifies the case in which, as the layer position at which a mark is formed in the bulk layer 102 (mark forming layer position, referred to also as information recording layer position), five information recording layer positions L from a first information recording layer position L1 to a fifth information recording layer position L5 are set. As shown in the diagram, the first information recording layer position L1 is set as the position distant from the selective reflection film 103 (reference surface Ref), on which the guide groove is formed, by a first offset of-L1 in the focus direction (depth direction). The second information recording layer position L2, the third information recording layer position L3, the fourth information recording layer position L4, and the fifth information recording layer position L5 are set as the positions distant from the reference surface Ref by a second offset of-L2, a third offset of-L3, a fourth offset of-L4, and a fifth offset of-L5, respectively.

In recording at the timing when a mark has not yet been formed, it is impossible to carry out focus servo control and tracking servo control for the respective layer positions in the bulk layer 102 based on reflected light of the recording/reproducing laser light. Therefore, focus servo control and tracking servo control of the objective lens in recording are carried out based on reflected light of the servo laser light in such a manner that the spot position of the servo laser light follows the guide groove in the reference surface Ref.

However, it is necessary that the recording/reproducing laser light reaches the bulk layer 102 formed on the lower layer side of the reference surface Ref for mark recording. Therefore, in the optical system of this case, a focus mechanism for recording/reproducing light to independently adjust the in-focus position of the recording/reproducing laser light is provided separately from the focus mechanism of the objective lens.

FIG. 19 shows the outline of the optical system for recording and reproducing of the bulk recording medium 100, including the mechanism for independently adjusting the in-focus position of the recording/reproducing laser light.

In FIG. 19, the objective lens shown in also FIG. 18 is permitted to be displaced in the radial direction of the bulk recording medium 100 (tracking direction) and the direction along which the objective lens gets closer to or remoter from the bulk recording medium 100 (focus direction) by a two-axis actuator as shown in the diagram.

In FIG. 19, a focus mechanism (expander) in the diagram serves as the mechanism for independently adjusting the in-focus position of the recording/reproducing laser light. Specifically, this focus mechanism as the expander includes a fixed lens and a movable lens that is so held by a lens driver as to be capable of being displaced in the direction parallel to the optical axis of the recording/reproducing laser light. Through driving of the movable lens by the lens driver, the collimation of the recording/reproducing laser light incident on the objective lens in the diagram changes. Thus, the in-focus position of the recording/reproducing laser light is adjusted independently of the servo laser light.

Furthermore, the wavelength band is different between the recording/reproducing laser light and the servo laser light as described above. Therefore, in association with this, the optical system of this case is so configured that the reflected light of the recording/reproducing laser light and the servo laser light from the bulk recording medium 100 is split into the respective systems (i.e. each reflected light can be independently detected) by a dichroic prism in the diagram.

In view of the forward light, the dichroic prism has a function to combine the recording/reproducing laser light and the servo laser light onto the same axis and make them incident on the objective lens. Specifically, in this case, the recording/reproducing laser light passes through the expander and is reflected by a mirror as shown in the diagram and thereafter is reflected by the selective reflection surface of the dichroic prism to be incident on the objective lens. The servo laser light is transmitted through the selective reflection surface of the dichroic prism and is incident on the objective lens.

FIG. 20 is a diagram for explaining servo control in reproducing of the bulk recording medium 100.

In reproducing of the bulk recording medium 100 in which a mark has been already recorded, there is no need to control the position of the objective lens based on the reflected light of the servo laser light differently from recording. That is, in reproducing, focus servo control and tracking servo control of the objective lens can be carried out based on the reflected light of the recording/reproducing laser light for a mark sequence formed at the information recording layer position L (in reproducing, referred to also as information recorded layer L) as the reproducing subject.

In the above-described manner, in the bulk recording system, the bulk recording medium 100 is irradiated with the recording/reproducing laser light for recording and reproducing of the mark and the servo light as light for position control via a common objective lens (with combining onto the same optical axis). Based on this configuration, in recording, focus servo control and tracking servo control of the objective lens are so carried out that the servo laser light follows the position guide element of the reference surface Ref. In addition, the in-focus position of the recording/reproducing laser light is separately adjusted by the focus mechanism for recording/reproducing light. This allows mark recording at a desired position (depth direction and tracking direction) in the bulk layer 102 although the position guide element is not formed in the bulk layer 102.

In reproducing, focus servo control and tracking servo control of the objective lens based on the reflected light of the recording/reproducing laser light are so carried out that the in-focus position of the recording/reproducing laser light follows an already-recorded mark sequence. This allows reproducing of the mark recorded in the bulk layer 102.

In the case of employing the above-described bulk recording system, the reflectance of the recorded mark is very lower than that of the recording layer in the optical disc of the related art, such as BD.

So, employing a so-called homodyne system (homodyne detection system) as the reproducing system of the bulk recording medium 100 is being studied.

As is well known, the homodyne system is a technique of performing detection of light obtained by making coherent light (DC (direct current) light) as reference light interfere with light as the detection subject (signal light) to thereby achieve signal amplification.

A technique referred to as so-called differential detection is combined with this homodyne system. Specifically, light obtained by making reference light in phase with signal light interfere with the signal light and light obtained by making reference light in anti-phase with the signal light interfere with the signal light are individually received and the difference between these light reception signals is obtained. This allows achievement of both signal amplification and noise suppression.

In this case, because the homodyne system is based on utilization of the light interference effect, the optical path length difference between the signal light and the reference light should be set shorter than at least the coherence length for realization of the homodyne system. Therefore, in the homodyne system, optical path length servo control for keeping the optical path length difference between the signal light and the reference light constant at a predetermined value is carried out.

Regarding such optical path length servo control, descriptions are made also in e.g. Japanese Patent Laid-Open No. 2008-243273 and Japanese Patent Laid-Open No. 2008-269680.

SUMMARY

Particularly in the case of employing the void recording system, in which a vacancy mark is recorded, as the bulk recording system, possibly variation arises in the recorded mark size attributed to e.g. the characteristics of the laser for recording.

As is understood also from the above description, the recorded mark serves as a reflector in the bulk recording system and therefore the variation in its size leads to the occurrence of the difference in the amount of reflected light. Because of the occurrence of the difference in the amount of reflected light due to the mark size difference, a difference arises also in the reproduced signal amplitude, which should be detected with the same level originally. Attributed to this difference, possibly the reproduction performance is deteriorated.

Meanwhile, performing multi-value recording by aggressively changing the mark size is also being studied for the bulk recording system.

However, also in the case of performing multi-value recording based on the mark size difference, it is expected that control of the mark size is difficult. Thus, possibly the size differences among the marks corresponding to the respective values are not constant and it is difficult to sufficiently ensure the differences among these detected values. That is, as a result, possibly the lowering of the multi-value reproduction performance (performance of discrimination of the respective values) is caused.

In view of this point, it is preferable that the difference in the reproduced signal amplitude about the marks with the respective sizes can be highlighted in multi-value recording.

There is a need for a technique to allow reduction/enlargement of the difference in the amplitude of reproduced signals of recorded marks having sizes different from each other when a bulk recording system is employed.

According to an embodiment of the present disclosure, there is provided a reproducing device including a homodyne detection part configured to irradiate a recording layer of an optical recording medium with first light via an objective lens and irradiate a mirror with second light. The first light and the second light are obtained by splitting light emitted from a light source. The homodyne detection part carries out homodyne detection by using reflected light of the first light obtained from the recording layer as signal light and using reflected light of the second light by the mirror as reference light.

Furthermore, the reproducing device includes a signal reproducing part configured to obtain a reproduced signal based on the signal light, based on a result of homodyne detection by the homodyne detection part.

In addition, the reproducing device includes a one-axis actuator configured to drive the mirror in a direction parallel to the incident optical axis of the second light to the mirror.

Moreover, the reproducing device includes an optical path length servo control part configured to carry out driving control of the one-axis actuator in such a manner that the optical path length difference between the signal light and the reference light is kept constant based on a light reception signal by a light receiver that receives the signal light and the reference light.

Furthermore, the reproducing device includes an offset giving part configured to give an offset that reduces or enlarges the amplitude difference of the reproduced signal of marks that are recorded in the recording layer and have sizes different from each other, to an optical path length servo loop formed in association with servo control by the optical path length servo control part.

As described above, in the embodiment of the present disclosure, the homodyne system is employed as the signal reproduction system. In addition, an offset that reduces or enlarges the amplitude difference of the reproduced signal attributed to the difference in the recorded mark size is given to the servo loop of the optical path length servo control carried out in the homodyne system.

Also as described later, the homodyne measurement axis can be inclined by an arbitrary angle if an arbitrary offset is given to the optical path length servo loop. Thus, the embodiment of the present disclosure in which the above-described offset giving is performed can reduce or enlarge the difference in the reproduced signal amplitude attributed to the size difference of the recorded mark.

As a result, according to the embodiment of the present disclosure, the difference in the reproduced signal amplitude attributed to e.g. variation in the mark size (mark size variation) can be reduced to achieve suppression of the deterioration of the reproduction performance associated with the mark size variation. In addition, for the case of performing multi-value recording based on mark size modulation, the differences in the reproduced signal amplitude among the marks having the respective sizes can be enlarged to achieve enhancement in the multi-value reproduction performance.

As described above, the embodiment of the present disclosure can reduce or enlarge the difference in the reproduced signal amplitude attributed to the mark size difference.

This can achieve suppression of the deterioration of the reproduction performance associated with mark size variation and enhancement in the reproduction performance in the case of performing multi-value recording based on mark size modulation.

BRIEF DESCRIPTION OF THE DRAWINGS

FIGS. 4A and 4B are diagrams for explaining a specific technique of optical path length servo;

DETAILED DESCRIPTION OF THE PREFERRED EMBODIMENTS

Modes for carrying out the disclosure (hereinafter, referred to as embodiments) will be described below. The order of the description is as follows.

<1. First Embodiment>
[1-1. Optical Recording Medium as Reproducing Subject]
[1-2. Configuration of Reproducing Device]
[1-3. Specific Technique of Optical Path Length Servo]
[1-4. Relationship between Optical Path Length Servo and Reproduced Signal Amplitude]
[1-5. Variation in Reproduced Signal Amplitude Due to Mark Size Variation]
[1-6. Giving of Offset]
<2. Second Embodiment>
[2-1. Configuration of Reproducing Device]
[2-2. Giving of Offset]
<3. Modification Examples>
1. First Embodiment
[1-1. Optical Recording Medium as Reproducing Subject]

Figure 1:
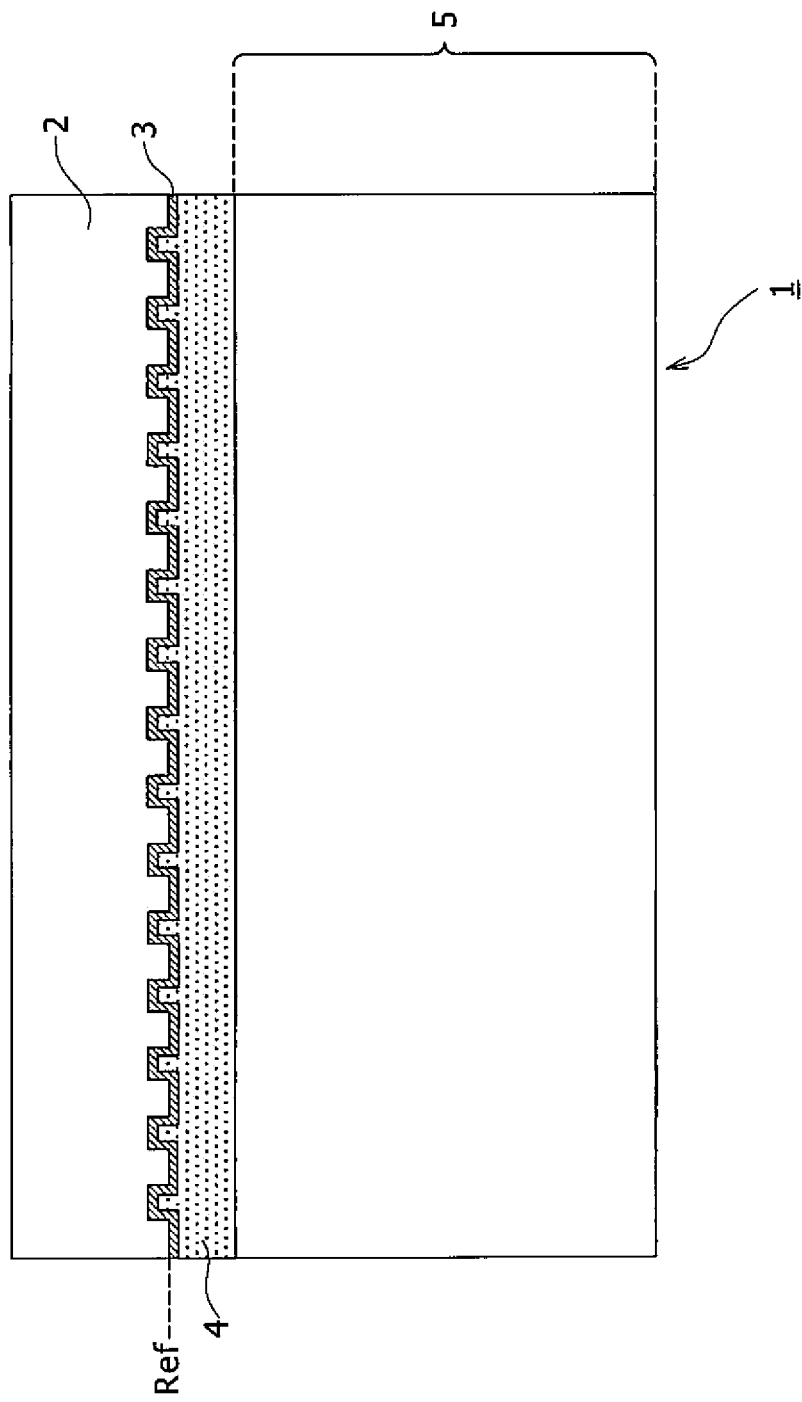
FIG. 1 is a diagram showing the sectional structure of an optical recording medium employed as the reproducing subject in an embodiment of the present disclosure.

FIG. 1 is a diagram showing the sectional structure of an optical recording medium employed as the reproducing subject in an embodiment of the present disclosure.

The optical recording medium employed as the reproducing subject in the embodiment is an optical recording medium of the bulk type similar to the above-described bulk recording medium 100, and will be referred to as a bulk recording medium 1 hereinafter.

The bulk recording medium 1 is a disc-shape recording medium. The bulk recording medium 1 driven to rotate is irradiated with laser light and mark recording (information recording) is performed. Reproduction of the recorded information is also performed through irradiation of the bulk recording medium 1 driven to rotate with laser light.

The term "optical recording medium" is a generic term of recording media to/from which information is recorded/reproduced through light irradiation.

As shown in the diagram, in the bulk recording medium 1, a cover layer 2, a selective reflection film 3, an intermediate layer 4, and a bulk layer 5 are formed in that order from the upper layer side.

The "upper layer side" in the present specification refers to the upper layer side when the surface on which laser light from the side of a reproducing device as an embodiment to be described later is incident is defined as the upper surface.

Furthermore, a term "depth direction" is used in the present specification. This "depth direction" refers to the direction corresponding with the upward/downward direction in accordance with the definition of "upper layer side" (i.e. direction parallel to the incident direction of laser light from the reproducing device side: focus direction).

In the bulk recording medium 1, the cover layer 2 is composed of e.g. a resin such as polycarbonate or acrylic resin. As shown in the diagram, a guide groove is formed on the lower surface side of the cover layer 2 as a position guide element for guiding the recording/reproducing position. Thus, the cover layer 2 is given an uneven sectional shape.

In this case, the guide groove is formed with a pit sequence (intermittent groove) or a groove (continuous groove) and its forming shape in the disc in-plane direction is a spiral or concentric circles.

The cover layer 2 is produced by e.g. injection molding by use of a stamper on which such a guide groove is formed.

The selective reflection film 3 is deposited on the lower surface side of the cover layer 2, on which the guide groove is formed.

Also as described above, in the bulk recording system, light for obtaining error signals of tracking and focus based on the position guide element such as the above-described guide groove (servo laser light) is irradiated separately from light for performing mark recording and reproducing with the bulk layer 5 as the recording layer (recording/reproducing laser light).

At this time, if the servo laser light reaches the bulk layer 5, possibly mark recording in this bulk layer 5 is adversely affected. Therefore, it is preferable to provide a reflection film having such selectivity as to reflect the servo laser light and transmit the recording/reproducing laser light.

In the typical bulk recording system, laser light beams in different wavelength bands are used as the recording/reproducing laser light and the servo laser light. For matching with this, a selective reflection film having such wavelength selectivity as to reflect light in the same wavelength band as that of the servo laser light and transmit light in the other wavelength band is used as the selective reflection film 3.

On the lower layer side of the selective reflection film 3, the bulk layer 5 as the recording layer is stacked (bonded) with the intermediary of the intermediate layer 4 composed of a bonding material such as a UV-curable resin.

As the forming material (recording material) of the bulk layer 5, the optimum material is accordingly employed depending on the employed bulk recording system such as the above-described positive micro-hologram system, negative micro-hologram system, or void recording system.

The mark recording system for the optimum recording medium as the subject in the embodiment of the present disclosure should not be particularly limited and an arbitrary system may be employed in the category of the bulk recording system. In the following description, the case in which the void recording system is employed will be exemplified as one example.

In the case of the void recording, the bulk layer 5 is composed of e.g. a resin.

In the bulk recording medium 1 having the above-described sectional structure, the selective reflection film 3, on which the position guide element is formed, is used as a reflection surface serving as the basis in position control of the recording/reproducing laser light based on the servo laser light also as described later. In this sense, hereinafter the surface on which the selective reflection film 3 is formed will be referred to as reference surface Ref.

Figure 18:
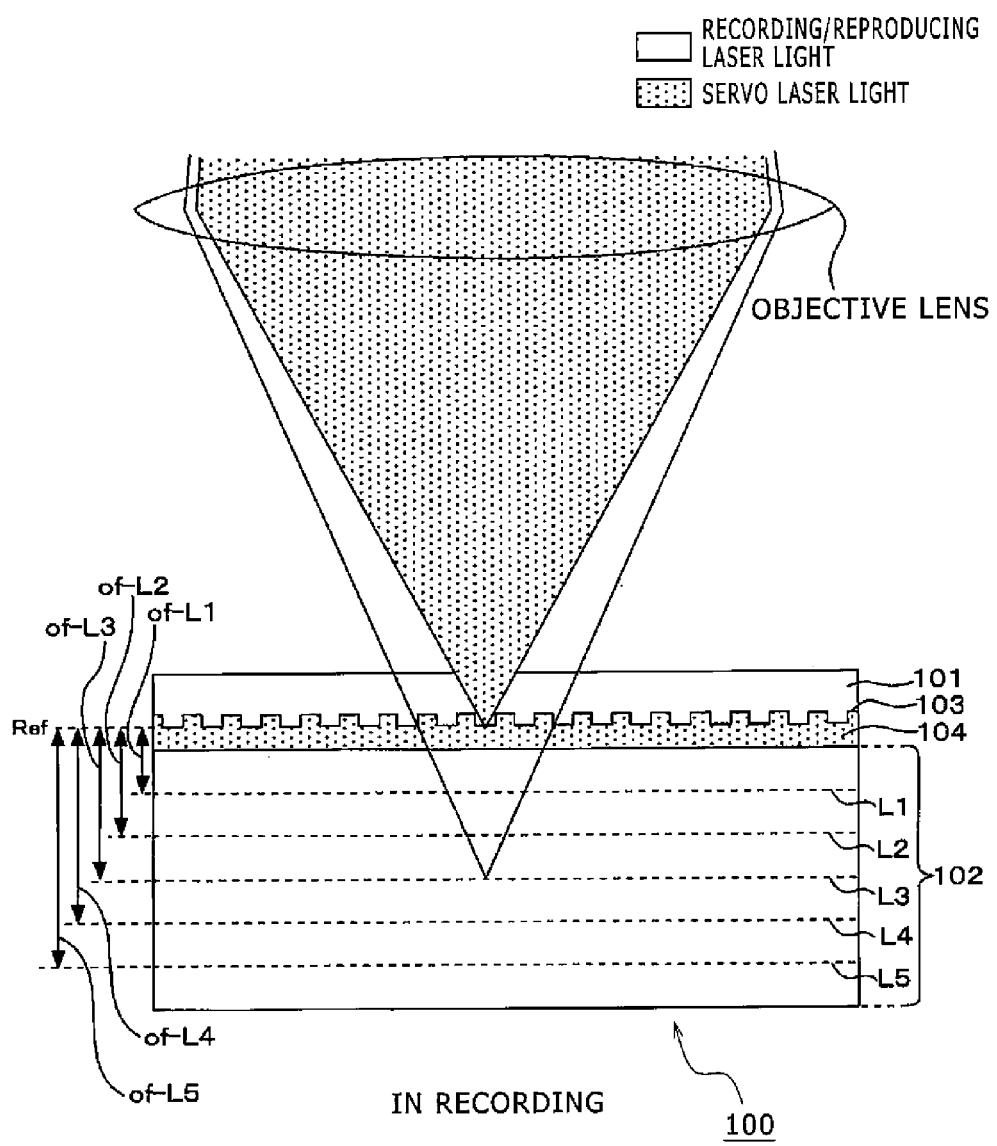
FIG. 18 is a diagram for explaining operation in mark recording in the bulk recording medium.

Also as described above with FIG. 18, in the optical recording medium of the bulk type, the respective layer positions (information recording layer positions L) at which information recording should be performed are set in advance for performing multilayer recording in the bulk-manner recording layer. Also in the bulk recording medium 1, as the information recording layer positions L, a first information recording layer position L1, a second information recording layer position L2, a third information recording layer position L3, a fourth information recording layer position L4, and a fifth information recording layer position L5 distant from the reference surface Ref in the depth direction by a first offset of-L1, a second offset of-L2, a third offset of-L3, a fourth offset of-L4, and a fifth offset of-L5, respectively, are set as with the case of FIG. 18.

Information on the offsets of-L of the respective layer positions L from the reference surface Ref is set in the reproducing device side in advance.

The number of information recording layer positions L should not be limited to five.

[1-2. Configuration of Reproducing Device]

Figure 2:
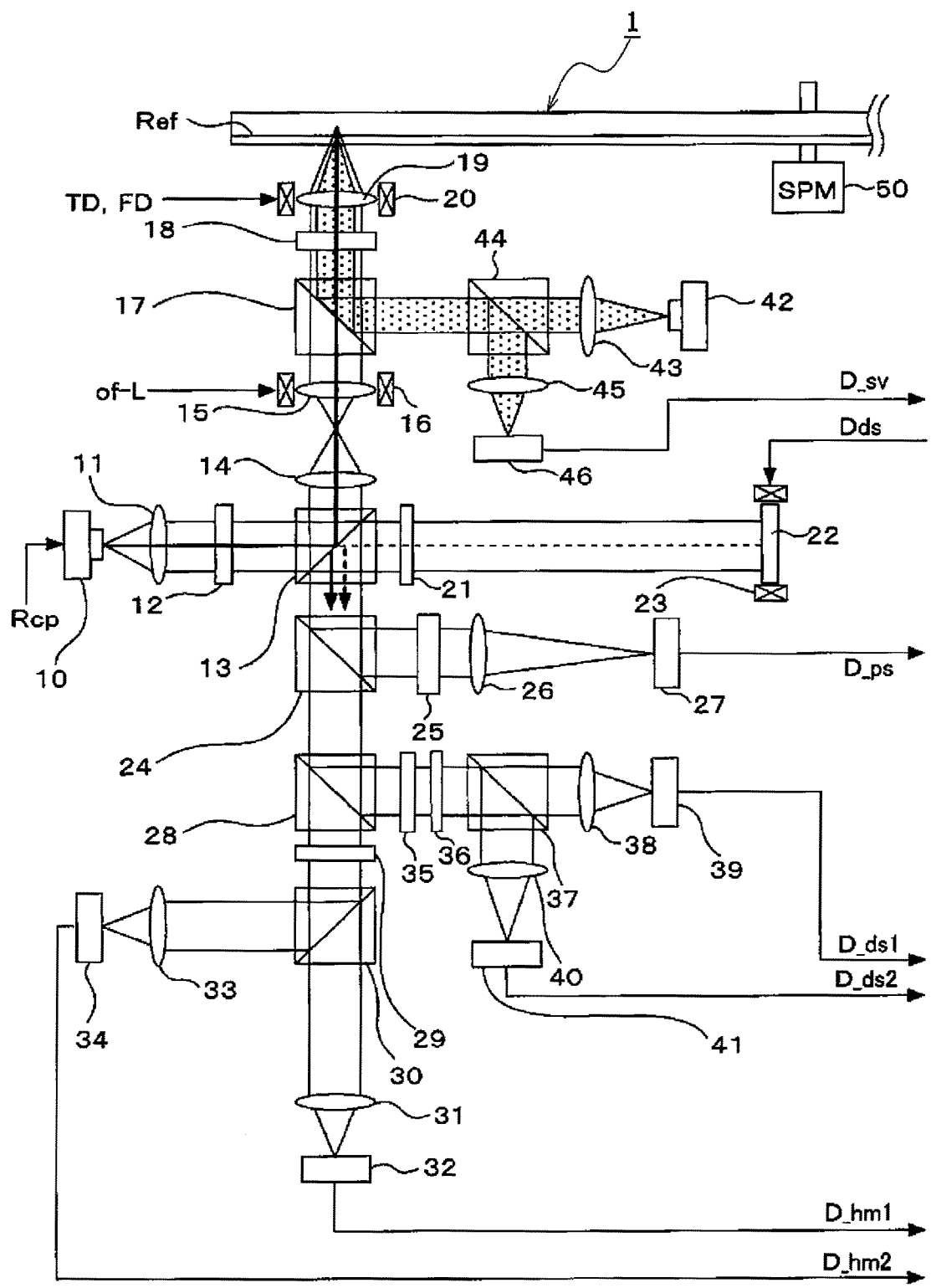
FIG. 2 is a diagram for explaining mainly the configuration of an optical system included in a reproducing device of the embodiment.

FIG. 2 is a diagram for explaining mainly the internal configuration of an optical pick-up OP included in the reproducing device as a first embodiment of the present disclosure to perform signal reproduction by the homodyne system for the above-described bulk recording medium 1.

In the diagram, the part except the bulk recording medium 1 and a spindle motor (SPM) 50 is the optical pick-up OP.

In FIG. 2, when being loaded in the reproducing device, the bulk recording medium 1 is driven to rotate by the spindle motor 50 in the diagram.

In the optical pick-up OP, the following optical systems are provided: an optical system for irradiation with laser light (recording/reproducing laser light) for reproduction about the bulk recording medium 1 thus driven to rotate; a reference light optical system for generating reference light used in homodyne detection; a homodyne detection optical system for receiving the reference light and reflected light of the recording/reproducing laser light from the bulk recording medium 1 to carry out homodyne detection; an optical system for irradiating the bulk recording medium 1 with the servo laser light and receiving reflected light of the servo laser light from the reference surface Ref; and an optical system for carrying out optical path length servo control.

In FIG. 2, a recording/reproducing laser 10 serves as the light source of the recording/reproducing laser light.

In this configuration, the wavelength of the recording/reproducing laser light output by the recording/reproducing laser 10 is about 405 nm. In contrast, the wavelength of the servo laser light to be described later is about 650 nm.

The recording/reproducing laser light emitted by the recording/reproducing laser 10 is rendered collimated light by a collimation lens 11 and then incident on a polarizing beam splitter (PBS) 13 via a half-wave plate 12.

The polarizing beam splitter 13 is so configured as to transmit P-polarized light and reflect S-polarized light for example. In addition, the attachment angle of the half-wave plate 12 (angle of rotation about the optical axis in the incident surface of the laser light) is so adjusted that the ratio of the light transmitted through the polarizing beam splitter 13 and output (P-polarized light component) and the light reflected and output (S-polarized light component) (i.e. the ratio of light splitting by the polarizing beam splitter 13) is 1 to 1.

The recording/reproducing laser light reflected by the polarizing beam splitter 13 is incident on an independent focus mechanism for recording/reproducing light, including a fixed lens 14, a movable lens 15, and a lens driver 16.

In the independent focus mechanism for recording/reproducing light, the fixed lens 14 is disposed on the side closer to the recording/reproducing laser 10 as the light source and the movable lens 15 is disposed on the side remoter from the light source. The movable lens 15 is driven in the direction parallel to the incident optical axis by the lens driver 16. This changes the collimation of the recording/reproducing laser light incident on an objective lens 19 and allows the in-focus position of the recording/reproducing laser light to be changed independently of the servo laser light.

Driving of the lens driver 16 is controlled by a controller 66 (FIG. 3) to be described later based on the offset value of-L.

The recording/reproducing laser light that has passed through the fixed lens 14 and the movable lens 15 formed in the independent focus mechanism for recording/reproducing light is incident on a dichroic prism 17.

The dichroic prism 17 is provided in order to combine the recording/reproducing laser light and the servo laser light as the forward light that should be irradiated to the bulk recording medium 1 onto the same optical axis, and separate the reflected light of the recording/reproducing laser light and the servo laser light obtained as reflected light (return light) from the bulk recording medium 1.

In the present example, the dichroic prism 17 is so configured as to transmit light in the same wavelength band as that of the recording/reproducing laser light and reflect light in the other wavelength band. Therefore, the recording/reproducing laser light incident on the dichroic prism 17 via the independent focus mechanism for recording/reproducing light as described above is transmitted through the dichroic prism 17 to be irradiated to the bulk recording medium 1 via a quarter-wave plate 18 and the objective lens 19.

The objective lens 19 is so held by a two-axis actuator 20 as to be capable of being displaced in the focus direction (direction along which the objective lens 19 gets closer to or remoter from the bulk recording medium 1) and the tracking direction (direction parallel to the radial direction of the bulk recording medium 1: direction perpendicular to the focus direction).

The two-axis actuator 20 is provided with a focus coil and a tracking coil. A focus drive signal FD and a tracking drive signal TD to be described later are supplied to the focus coil and the tracking coil, respectively, whereby the two-axis actuator 20 displaces the objective lens 19 in the focus direction and the tracking direction.

In response to the irradiation of the bulk recording medium 1 with the recording/reproducing laser light via the objective lens 19, reflected light from the bulk recording medium 1 (mark recorded in the bulk layer 5) is obtained.

This reflected light of the recording/reproducing laser light passes through the objective lens 19 and the quarter-wave plate 18 and then is transmitted through the dichroic prism 17 to be returned to the polarizing beam splitter 13 via the independent focus mechanism for recording/reproducing light.

Hereinafter, the reflected light of the recording/reproducing laser light, obtained from the bulk layer 5 in the above-described manner, will be referred to as "signal light."

The polarization direction of the signal light (return light) incident on the polarizing beam splitter 13 is different by 90° from the polarization direction of the light that is incident from the recording/reproducing laser 10 and reflected by the polarizing beam splitter 13 (defined as forward light) due to the effect by the quarter-wave plate 18 and the effect at the time of the reflection by the bulk layer 5 (mark). That is, the signal light is incident on the polarizing beam splitter 13 as P-polarized light.

Therefore, the signal light as the return light is transmitted through the polarizing beam splitter 13.

Furthermore, in the optical pick-up OP, the laser light (P-polarized light) emitted by the recording/reproducing laser 10 and transmitted through the polarizing beam splitter 13 functions as reference light in the homodyne system.

The reference light transmitted through the polarizing beam splitter 13 passes through a quarter-wave plate 21 in the diagram and is incident on a mirror 22 held by a one-axis actuator 23.

The one-axis actuator 23 holds the mirror 22 in such a manner that the mirror 22 can be displaced in the direction parallel to the optical axis of the reference light incident on the mirror 22. The one-axis actuator 23 is driven by a drive signal Dds in the diagram.

This one-axis actuator 23 is provided in order to realize the optical path length servo to be described later.

Examples of the one-axis actuator 23 include an actuator based on the electromagnetic driving system, such as a voice coil motor, and an actuator using a piezo element.

The reference light reflected by the mirror 22 is incident on the polarizing beam splitter 13 via the quarter-wave plate 21.

The polarization direction of the reference light (return light) thus incident on the polarizing beam splitter 13 is different by 90° from the polarization direction of the reference light as the forward light (i.e. the reference light as the return light is S-polarized light) due to the effect by the quarter-wave plate 21 and the effect at the time of the reflection by the mirror 22. Therefore, the reference light as the return light is reflected by the polarizing beam splitter 13.

In the diagram, the reference light thus reflected by the polarizing beam splitter 13 is indicated by a dashed arrow.

Furthermore, the signal light transmitted through the polarizing beam splitter 13 in the above-described manner is indicated by a solid arrow in the diagram.

These signal light and reference light output from the polarizing beam splitter 13 are incident on a beam splitter (non-polarizing beam splitter) 24, so that part of the light is transmitted through the beam splitter 24 and part of the light is reflected by the beam splitter 24.

The signal light and reference light reflected by the beam splitter 24 are guided to a reference light remover 25 as shown in the diagram and only the signal light is extracted through removal of the reference light. Thereafter, the signal light is collected on the light receiving surface of a light receiver 27 for position control via a collecting lens 26.

The optical system composed of the reference light remover 25, the collecting lens 26, and the light receiver 27 for position control is provided as a light receiving system for generating a focus error signal FE-rp and a tracking error signal TE-rp for focus servo control and tracking servo control of the objective lens 19. That is, this optical system serves as a light receiving system for obtaining the error signals used in the focus and tracking servo control about the objective lens 19 based on reflected light of the recording/reproducing laser light in reproducing.

The frequency band of the focus error signal FE-rp and the tracking error signal TE-rp is very lower compared with the reproduced signal (RF (radio frequency) signal) about the information signal recorded in the bulk recording medium 1. Thus, the deterioration of the SNR (signal-to-noise ratio) is suppressed even when the amount of detected light is small. Therefore, in the present example, only the signal light is separated and independently detected by the above-described light receiving system for detection of the error signals.

In this light receiving system, the reference light remover 25 can be configured by e.g. a polarizing plate or a polarizing beam splitter.

As shown in the diagram, the light reception signal obtained by the light receiver 27 for position control is represented as the light reception signal D_ps.

The signal light and reference light transmitted through the beam splitter 24 are incident on a beam splitter (non-polarizing beam splitter) 28, so that part of the light is transmitted through the beam splitter 28 and part of the light is reflected by the beam splitter 28.

The signal light and reference light transmitted through the beam splitter 28 are guided to the homodyne detection optical system composed of a half-wave plate 29, a polarizing beam splitter 30, a collecting lens 31, a first light receiver 32 for homodyne detection, a collecting lens 33, and a second light receiver 34 for homodyne detection.

The signal light and reference light reflected by the beam splitter 28 are guided to a light receiving system for optical path length servo, composed of a quarter-wave plate 35, a half-wave plate 36, a polarizing beam splitter 37, a collecting lens 38, a first light receiver 39 for optical path length servo, a collecting lens 40, and a second light receiver 41 for optical path length servo.

First, in the homodyne detection optical system, the signal light and reference light transmitted through the beam splitter 28 pass through the half-wave plate 29 and then are incident on the polarizing beam splitter 30. The polarizing beam splitter 30 is so configured as to transmit P-polarized light and reflect S-polarized light similarly to the polarizing beam splitter 13.

As shown in the diagram, the light transmitted through the polarizing beam splitter 30 is collected on the light receiving surface of the first light receiver 32 for homodyne detection via the collecting lens 31. The light reflected by the polarizing beam splitter 30 is collected on the light receiving surface of the second light receiver 34 for homodyne detection via the collecting lens 33.

The polarization directions of the signal light transmitted through the polarizing beam splitter 13 as described above (P-polarized light) and the reference light reflected by the polarizing beam splitter 13 (S-polarized light) are orthogonal to each other, and therefore light interference does not occur at this timing.

In the homodyne detection optical system, the attachment angle (rotation angle) of the half-wave plate 29 is so adjusted that the polarization directions of the signal light and reference light incident from the beam splitter 28 are rotated by 45° in a clockwise manner with respect to the light traveling direction.

Furthermore, in the homodyne detection optical system, each of the signal light and the reference light is split by the polarizing beam splitter 30 into light beams with orthogonal polarization directions as the transmitted light and reflected light of the polarizing beam splitter 30.

At this time, both of the signal light and reference light transmitted through the polarizing beam splitter 30 are P-polarized light. Therefore, these light beams are collected into the first light receiver 32 for homodyne detection via the collecting lens 31 as light beams in phase with each other. That is, as a result, light obtained by making the reference light in phase with the signal light be combined (interfere) with the signal light is received by the first light receiver 32 for homodyne detection.

As shown in the diagram, the light reception signal by the first light receiver 32 for homodyne detection is represented as the light reception signal D_hm1.

As for the signal light and reference light reflected by the polarizing beam splitter 30, the phase of the reference light is different from that of the signal light by 180° (π) due to the above-described clockwise rotation of the polarization directions of these light beams by 45° because of the half-wave plate 29 and the effect at the time of the reflection on the light splitting surface of the polarizing beam splitter 30.

Due to this feature, light obtained by making the reference light in anti-phase with the signal light be combined (interfere) with the signal light is received by the second light receiver 34 for homodyne detection.

The light reception signal by the second light receiver 34 for homodyne detection is represented as the light reception signal D_hm2.

As described above, the signal light and reference light reflected by the beam splitter 28 are guided to the light receiving system for optical path length servo.

In the light receiving system for optical path length servo, the signal light and reference light reflected by the beam splitter 28 pass through the quarter-wave plate 35 and the half-wave plate 36 and then are incident on the polarizing beam splitter 37. This polarizing beam splitter 37 is also so configured as to transmit P-polarized light and reflect S-polarized light similarly to the polarizing beam splitters 13 and 30.

As shown in the diagram, the light transmitted through the polarizing beam splitter 37 is collected on the light receiving surface of the first light receiver 39 for optical path length servo via the collecting lens 38. The light reflected by the polarizing beam splitter 37 is collected on the light receiving surface of the second light receiver 41 for optical path length servo via the collecting lens 40.

Through comparison between the configuration of this light receiving system for optical path length servo and the configuration of the homodyne detection optical system, it turns out that the light receiving system for optical path length servo is obtained by adding the quarter-wave plate 35 to the configuration of the homodyne detection optical system. This quarter-wave plate 35 is so adjusted as to retard the phase of the reference light or the signal light by 90° without changing the polarization directions of the signal light (P-polarized light) and the reference light (S-polarized light). The half-wave plate 36 is also so adjusted as to rotate the polarization directions of the signal light and reference light incident from the beam splitter 28 by 45° in a clockwise manner with respect to the light traveling direction similarly to the half-wave plate 29.

Due to the addition of the quarter-wave plate 35, the phase of the synthetic light of the signal light and reference light received by the first light receiver 39 for optical path length servo is shifted by 90° from the phase of the synthetic light received by the first light receiver 32 for homodyne detection. Similarly, the phase of the synthetic light of the signal light and reference light received by the second light receiver 41 for optical path length servo is shifted by 90° from the phase of the synthetic light received by the second light receiver 34 for homodyne detection.

In other words, when expression is made as follows: the first light receiver 32 for homodyne detection receives the synthetic light of "signal light of phase 0°" and "reference light of phase 0°" and the second light receiver 34 for homodyne detection receives the synthetic light of "signal light of phase 0°" and "reference light of phase 180°," the first light receiver 39 for optical path length servo receives the synthetic light of "signal light of phase 90°" and "reference light of phase 90°" and the second light receiver 41 for optical path length servo receives the synthetic light of "signal light of phase 90°" and "reference light of phase 270°."

As shown in the diagram, the light reception signal by the first light receiver 39 for optical path length servo is represented as the light reception signal D_ds1 and the light reception signal by the second light receiver 41 for optical path length servo is represented as the light reception signal D_ds2.

In the optical pick-up OP, a servo light optical system in which a servo laser 42 in the diagram is used as the light source is provided.

In the servo light optical system, the servo laser light emitted by the servo laser 42 is rendered collimated light by a collimation lens 43 and thereafter incident on a polarizing beam splitter 44. The polarizing beam splitter 44 is so configured as to transmit the servo laser light (forward light) thus incident from the servo laser 42.

The servo laser light transmitted through the polarizing beam splitter 44 is incident on the dichroic prism 17 as shown in the diagram. The dichroic prism 17 is so configured as to transmit light in the same wavelength band as that of the recording/reproducing laser light and reflect light in the other wavelength band as described above. Thus, the servo laser light is reflected by the dichroic prism 17. As a result, the servo laser light is combined onto the same axis as that of the recording/reproducing laser light as shown in the diagram and irradiated to the bulk recording medium 1 via the quarter-wave plate 18 and the objective lens 19.

The reflected light of the servo laser light (reflected light from the reference surface Ref) obtained in response to the irradiation of the bulk recording medium 1 with the servo laser light passes through the objective lens 19 and the quarter-wave plate 18 and is reflected by the dichroic prism 17 and thereafter incident on the polarizing beam splitter 44.

The polarization direction of the reflected light (return light) of the servo laser light thus incident from the bulk recording medium 1 is different by 90° from the polarization direction of the forward light due to the effect of the quarter-wave plate 18 and the effect at the time of the reflection by the reference surface Ref. Therefore, the reflected light as the return light is reflected by the polarizing beam splitter 44.

The reflected light of the servo laser light reflected by the polarizing beam splitter 44 is collected on the light receiving surface of a light receiver 46 for servo light via a collecting lens 45.

The light reception signal obtained by the light receiver 46 for servo light is represented as the light reception signal D_sv.

Figure 3:
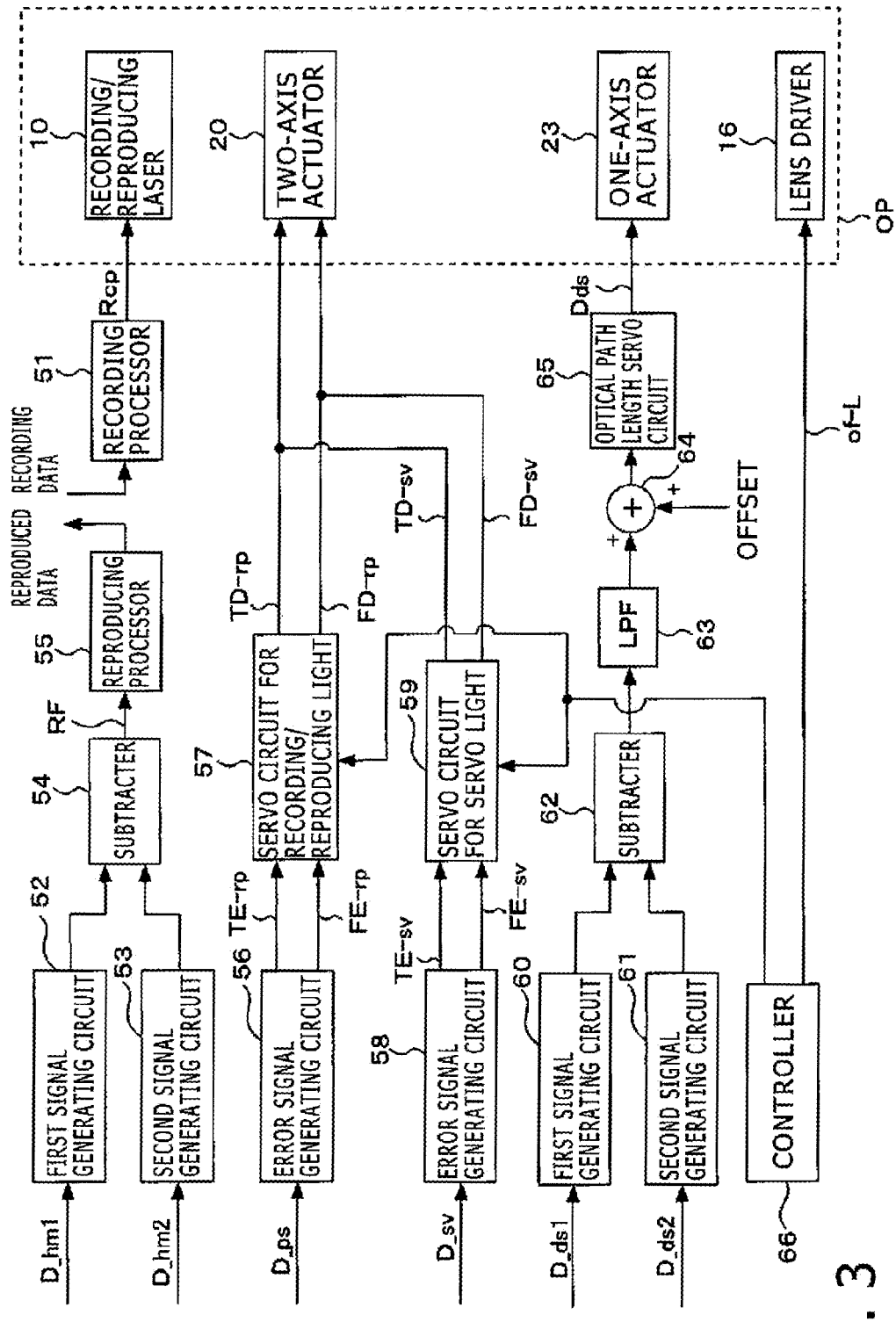
FIG. 3 is a diagram for explaining the internal configuration of the whole of a reproducing device as a first embodiment of the present disclosure.

FIG. 3 is a diagram for explaining the internal configuration of the whole reproducing device of the first embodiment.

In FIG. 3, in the optical pick-up OP, only the recording/reproducing laser 10, the lens driver 16, the two-axis actuator 20, and the one-axis actuator 23 are picked out and shown.

In this diagram, diagrammatic representation of the spindle motor 50 is omitted.

As shown in the diagram, at the outside of the optical pick-up OP, a recording processor 51 for driving the recording/reproducing laser 10 for its light emission to perform mark recording (information recording) in the bulk layer 5 is provided.

Furthermore, a first signal generating circuit 52, a second signal generating circuit 53, a subtractor 54, and a reproducing processor 55 are provided as the configuration for obtaining reproduced data based on the light reception signal D_hm1 by the first light receiver 32 for homodyne detection and the light reception signal D_hm2 by the second light receiver 34 for homodyne detection shown in FIG. 2.

In addition, an error signal generating circuit 56 and a servo circuit 57 for recording/reproducing light are provided as the configuration for carrying out servo control (servo control in reproducing) about the two-axis actuator 20 (objective lens 19) based on the light reception signal D_ps by the light receiver 27 for position control.

Moreover, an error signal generating circuit 58 and a servo circuit 59 for servo light are provided as the configuration for carrying out servo control (servo control in recording) about the two-axis actuator 20 based on the light reception signal D_sv by the light receiver 46 for servo light.

Furthermore, a first signal generating circuit 60, a second signal generating circuit 61, a subtractor 62, a low-pass filter (LPF) 63, an adder 64, and an optical path length servo circuit 65 are provided as the configuration for carrying out optical path length servo control based on the light reception signal D_ds1 by the first light receiver 39 for optical path length servo and the light reception signal D_ds2 by the second light receiver 41 for optical path length servo.

The configuration of this optical path length servo system will be described anew later.

First, data that should be recorded in the bulk recording medium 1 (in the diagram, recording data) is input to the recording processor 51.

The recording processor 51 executes e.g. addition processing of an error correction code and necessary modulation processing such as recording modulation encoding processing in accordance with a predetermined recording modulation system about the input recording data, and obtains a code sequence based on e.g. a binary data sequence of "0" and "1" to be recorded in the bulk recording medium 1. Furthermore, the recording processor 51 generates a recording pulse signal Rcp based on the code sequence thus obtained based on the recording data and drives the recording/reproducing laser 10 for its light emission based on this recording pulse signal Rcp.

Thus, information recording in the bulk recording medium 1 is performed.

Just for the record, in the void recording system of this case, not mark edge recording employed for compact disc (CD), digital versatile disc (DVD), Blu-ray Disc (registered trademark: BD), and so forth but mark position recording (recording system in which a code is represented based on whether or not mark recording is present at the position where the mark should be present) is employed.

The first signal generating circuit 52 receives the light reception signal D_hm1 and performs I-V conversion, to obtain a reproduced signal about the light obtained by making the reference light in phase with the signal light interfere with the signal light.

The second signal generating circuit 53 receives the light reception signal D_hm2 and performs I-V conversion, to obtain a reproduced signal about the light obtained by making the reference light in anti-phase with the signal light interfere with the signal light.

The respective reproduced signals obtained by the first signal generating circuit 52 and the second signal generating circuit 53 are supplied to the subtractor 54.

The subtractor 54 subtracts the reproduced signal supplied from the second signal generating circuit 53 from the reproduced signal supplied from the first signal generating circuit 52. In other words, this subtractor 54 performs arithmetic operation of "the reproduced signal about the light obtained by making the reference light in phase with the signal light interfere with the signal light"–"the reproduced signal about the light obtained by making the reference light in anti-phase with the signal light interfere with the signal light."

By this arithmetic operation by the subtractor 54, so-called differential detection is performed. By this differential detection, the reference light component as a DC component is removed (cancelled out) and the amplified signal light component can be obtained.

Hereinafter, the reproduced signal about the signal light obtained by the differential detection by the subtractor 54 will be represented also as the RF signal for discrimination from the reproduced signals obtained by the first signal generating circuit 52 and the second signal generating circuit 53.

The RF signal obtained by the subtractor 54 is supplied to the reproducing processor 55.

The reproducing processor 55 executes reproduction processing for obtaining the above-described recording data, such as binarization processing and decoding and error correction processing for the recording modulated code, about the RF signal, to obtain reproduced data arising from restoration of this recording data.

The error signal generating circuit 56 generates the focus error signal FE-rp and the tracking error signal TE-rp based on the light reception signal D_ps from the light receiver 27 for position control.

The servo circuit 57 for recording/reproducing light generates a focus servo signal and a tracking servo signal based on the focus error signal FE-rp and the tracking error signal TE-rp, respectively, generated in the error signal generating circuit 56. Subsequently, the servo circuit 57 for recording/reproducing light drives the focus coil and the tracking coil of the two-axis actuator 20 by a focus drive signal FD-rp and a tracking drive signal TD-rp, respectively, generated from these focus servo signal and tracking servo signal.

Thus, the focus servo loop and tracking servo loop (in reproducing) about the objective lens 19 are formed.

The error signal generating circuit 58 generates a focus error signal FE-sv and a tracking error signal TE-sv based on the light reception signal D_sv from the light receiver 46 for servo light.

The servo circuit 59 for servo light generates a focus servo signal and a tracking servo signal based on the focus error signal FE-sv and the tracking error signal TE-sv, respectively, generated in the error signal generating circuit 58. Subsequently, the servo circuit 59 for servo light drives the focus coil and the tracking coil of the two-axis actuator 20 by a focus drive signal FD-sv and a tracking drive signal TD-sv, respectively, generated from these focus servo signal and tracking servo signal.

Thus, the focus servo loop and tracking servo loop (in recording) about the objective lens 19 are formed.

The controller 66 is formed of e.g. a microcomputer including a central processing unit (CPU) and memories (storage devices) such as a read only memory (ROM) and a random access memory (RAM), and executes control and processing in accordance with e.g. a program stored in the ROM and so forth to thereby carry out overall control of the reproducing device.

In the controller 66, the values of the offset of-L decided corresponding to the respective information recording layer positions L in advance are set as described above. The controller 66 controls (sets) the in-focus position of the recording/reproducing laser light based on the value of the offset of-L of each layer position L, thus set in advance. Specifically, the controller 66 selects the recording position in the depth direction by driving the lens driver 16 based on the value of the offset of-L set corresponding to the layer position L as the recording subject.

Figure 19:
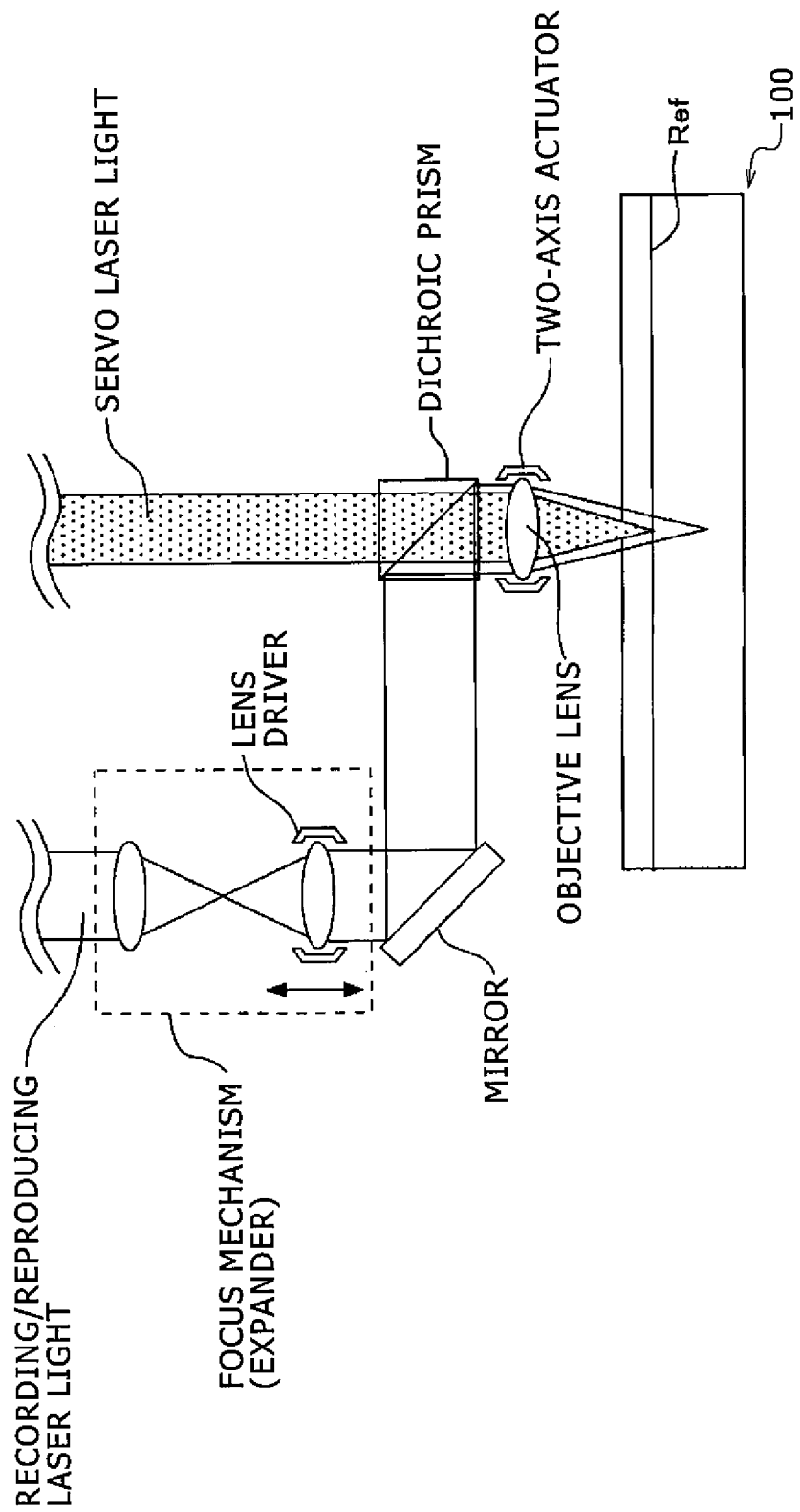
FIG. 19 is a diagram for explaining the outline of an optical system for recording and reproducing of the bulk recording medium.
Figure 20:
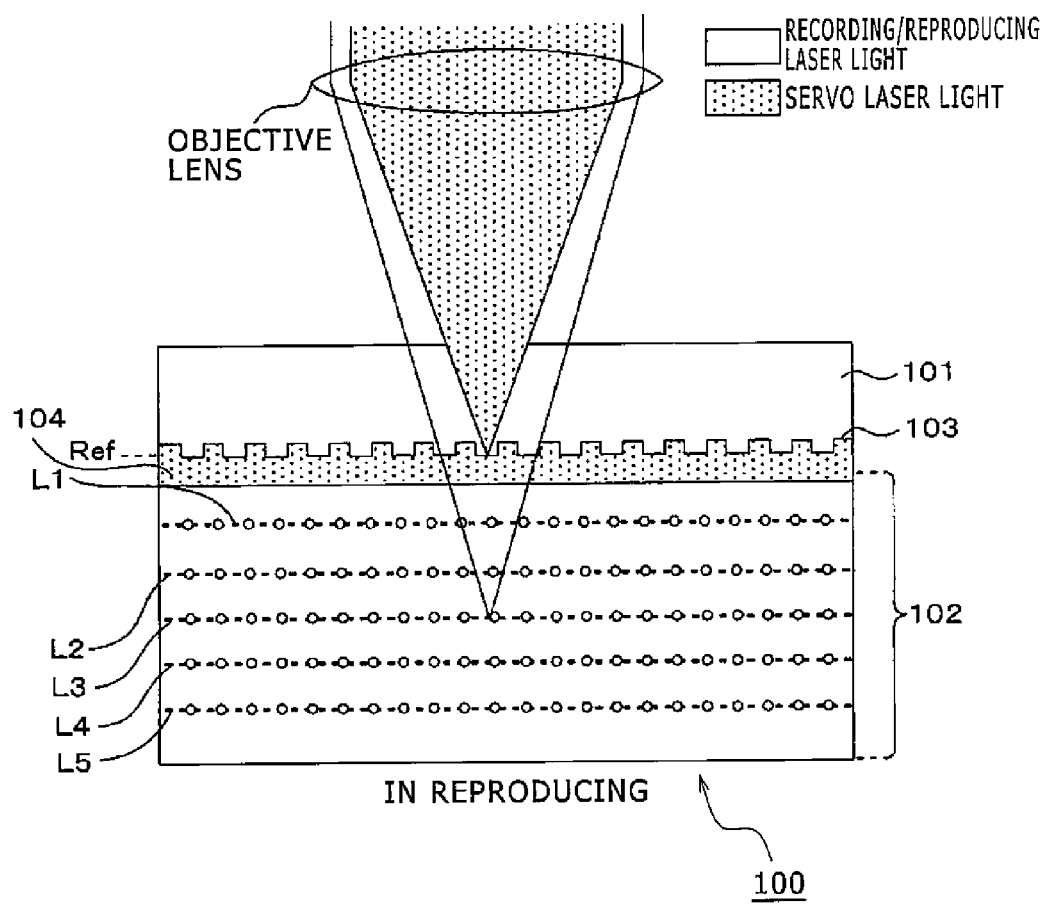
FIG. 20 is a diagram for explaining servo control in reproducing of the bulk recording medium.

Furthermore, the controller 66 carries out also control to realize servo control switching of the objective lens 19 in recording/reproducing, like that described above with FIG. 18 to 20.

Specifically, in recording, the controller 66 carries out control to make the servo circuit 59 for servo light carry out driving control of the two-axis actuator 20 by the tracking drive signal TD-sv and the focus drive signal FD-sv and stop the servo control operation by the servo circuit 57 for recording/reproducing light. In reproducing, the controller 66 carries out control to make the servo circuit 57 for recording/reproducing light carry out driving control of the two-axis actuator 20 by the tracking drive signal TD-rp and the focus drive signal FD-rp and stop the servo control operation by the servo circuit 59 for servo light.

[1-3. Specific Technique of Optical Path Length Servo]

The homodyne system is a technique of making the reference light interfere with the signal light to thereby achieve signal amplification. Therefore, it is preferable to adjust the optical path length difference between the signal light and the reference light, specifically for example to set the optical path length difference between the signal light and the reference light shorter than the coherence length, so that the amplification effect may be maximally exerted.

The state in which the amplification effect by the homodyne system is the maximum is equivalent to the state in which the amplitude of the reproduced signal about the signal light is the maximum. That is, this is equivalent to the state in which the amplitude of the RF signal obtained by the subtractor 54 is the maximum.

In association with this point, the reproducing device of the present example employs a technique in which the optical path length difference between the signal light and the reference light is so adjusted that the amplitude of the RF signal obtained by the subtractor 54 is set to the maximum as optical path length servo control.

However, employing the maximum value of the input signal (error signal) as the target value for the servo control is not preferable in terms of realization of stable servo control.

Therefore, the present example employs a technique in which not the RF signal itself obtained by the subtractor 54 but a signal with the phase shifted from that of this signal by 90° is used as the error signal of the optical path length servo.

FIGS. 4A and 4B are diagrams for explaining this point. FIG. 4A shows the waveform of "reproduced signal hm1"–"reproduced signal hm2" when the optical path length difference between the signal light and the reference light is changed. FIG. 4B shows the waveform of "reproduced signal ds1"–"reproduced signal ds2" when the optical path length difference between the signal light and the reference light is changed.

Here, "reproduced signal hm1" and "reproduced signal hm2" represent the reproduced signals by the first signal generating circuit 52 and the second signal generating circuit 53, respectively, and "reproduced signal hm1"–"reproduced signal hm2" is equivalent to the output of the subtractor 54 (i.e. RF signal).

Furthermore, "reproduced signal ds1" and "reproduced signal ds2" represent the reproduced signal by the first signal generating circuit 60 and the reproduced signal by the second signal generating circuit 61 shown in FIG. 3, and "reproduced signal ds1"–"reproduced signal ds2" is equivalent to the output of the subtractor 62.

As is apparent from reference to FIGS. 4A and 4B, the waveform of "reproduced signal ds1"–"reproduced signal ds2," which is the difference between the reproduced signal ds1 obtained through reception of the light reception signal D_ds1 and the reproduced signal ds2 obtained through reception of the light reception signal D_ds2, has the phase shifted (retarded, in this case) by 90° from the phase of the waveform of "reproduced signal hm1"–"reproduced signal hm2" obtained by the homodyne detection (and differential detection) system. This is because the synthetic light (signal light+ reference light) serving as the source of the light reception signals D_ds1 and D_ds2 as described above is so adjusted as to have the phase shifted by 90° from the phase of the synthetic light serving as the source of the light reception signals D_hm1 and D_hm2 used in the homodyne detection system.

From this, it turns out that the target value of the optical path length servo control for maximizing the reproduced signal (RF signal) about the signal light can be set to zero by using the output of the subtractor 62 as "reproduced signal ds1"–"reproduced signal ds2" as the optical path length error signal.

Based on the above-described point, the optical path length servo system shown in FIG. 3 will be described below.

In the optical path length servo system, the first signal generating circuit 60 receives the light reception signal D_ds1 and performs I-V conversion, to obtain a reproduced signal about light obtained by making the reference light in phase with the signal light (phase 90°) interfere with the signal light.

The second signal generating circuit 61 receives the light reception signal D_ds2 and performs I-V conversion, to obtain a reproduced signal about light obtained by making the reference light in anti-phase with the signal light (phase 90°) interfere with the signal light.

The respective reproduced signals obtained by the first signal generating circuit 60 and the second signal generating circuit 61 are supplied to the subtractor 62.

The subtractor 62 subtracts the reproduced signal supplied from the second signal generating circuit 61 from the reproduced signal supplied from the first signal generating circuit 60. By this subtraction processing by the subtractor 62, the reference light component as a DC component is removed and the amplified signal light component can be obtained.

The subtraction result by the subtractor 62 is input to the optical path length servo circuit 65 via the low-pass filter 63 and the adder 64.

The low-pass filter 63 extracts the lower-frequency component of the reproduced signal obtained as the subtraction result by the subtractor 62 (reproduced signal having a phase difference of 90° from the RF signal).

By this low-pass filter 63, the reproduced signal amplitude is averaged. That is, the amplitude of the part of the code "0" and the amplitude of the part of the code "1" are averaged.

Hereinafter, the output of the low-pass filter 63 will be referred to as the optical path length error signal.

Details of the adder 64 will be described later.

The optical path length servo circuit 65 receives the optical path length error signal input via the adder 64 and generates the drive signal Dds for driving the one-axis actuator in such a manner that the value of this optical path length error signal is kept constant at a predetermined target value. Specifically, in this case, the optical path length servo circuit 65 generates the drive signal Dds for keeping the value of the input optical path length error signal constant at zero and controls the driving of the one-axis actuator 23 based on this drive signal Dds.

This realizes the optical path length servo control to maximize the RF signal (giving of an offset to be described later is not taken into consideration).

[1-4. Relationship between Optical Path Length Servo and Reproduced Signal Amplitude]

As is understood also from the above description, in the reproducing device of the present example, optical path length servo control is so carried out that the RF signal (i.e. reproduced signal about signal light) is maximized.

With reference to FIGS. 5A to 6B, the principle of reproduction of the RF signal by the homodyne system when such optical path length servo control is carried out will be schematically described by expression with a quadrature phase space.

First, with FIGS. 5A and 5B, the electric field vector of the signal light in the quadrature phase space will be described.

Figure 5A:
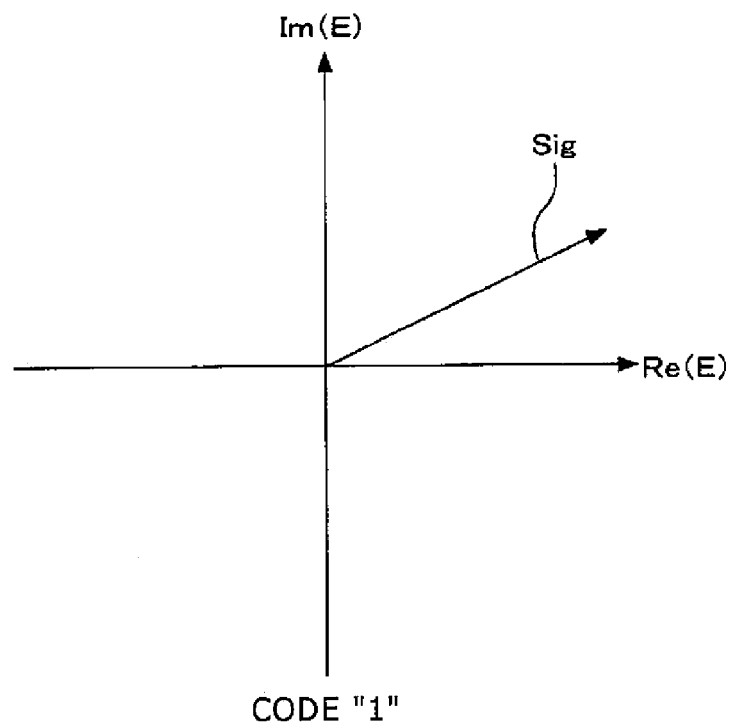
FIGS. 5A and 5B are diagrams for explaining the electric field vector of signal light in a quadrature phase space.
Figure 5B:
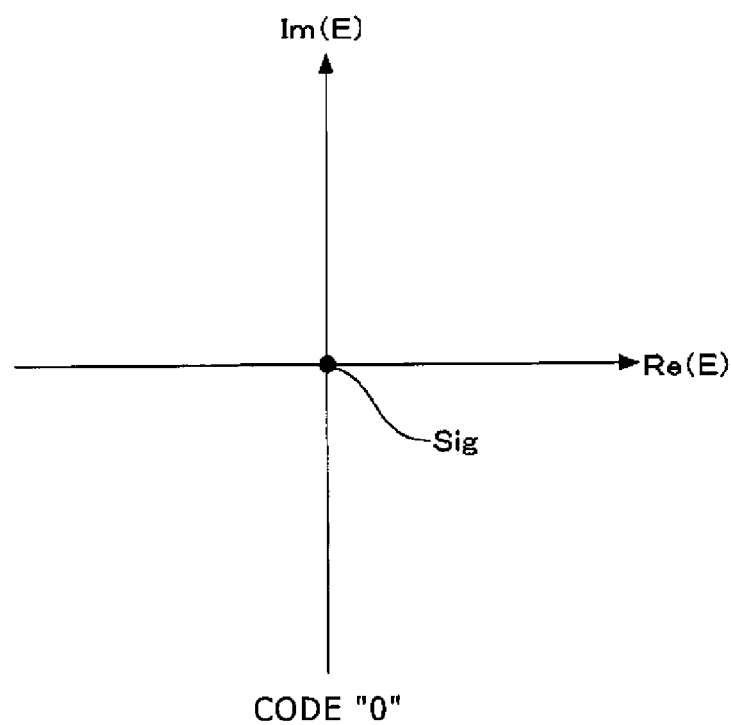

In FIGS. 5A and 5B, FIG. 5A shows the electric field vector of signal light Sig corresponding to the code "1" as the electric field vector of the signal light (Sig) on the quadrature phase space. In other words, FIG. 5A shows the electric field vector of the signal light Sig modulated by a recorded mark.

FIG. 5B shows the electric field vector of the signal light Sig corresponding to the code "0" (part at which no mark is formed). In this case, the electric field intensity of the signal light Sig is "0" as shown in the diagram because a reflector as a vacancy mark is not formed.

Figure 6A:
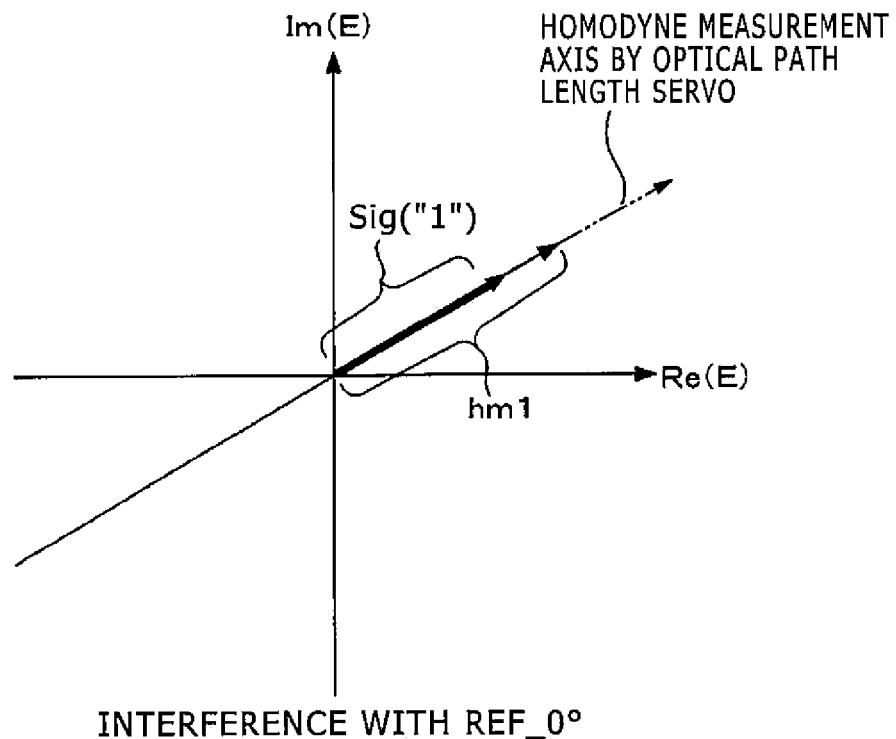
FIGS. 6A and 6B are diagrams for explaining the principle of reproduction by a homodyne system.
Figure 6B:
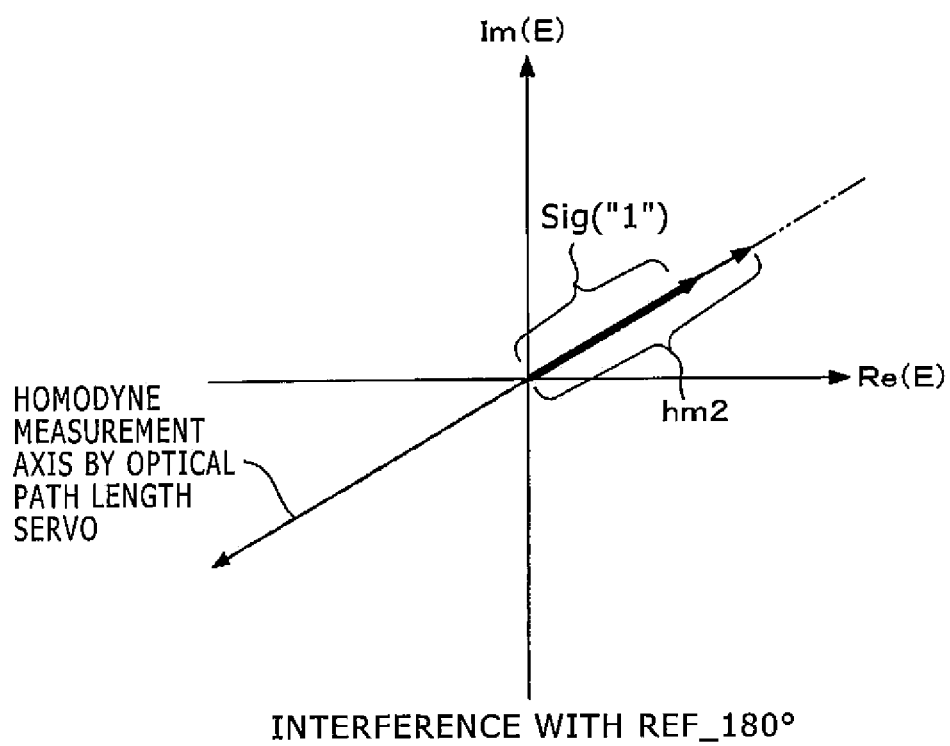

FIGS. 6A and 6B are diagrams for explaining the principle of reproduction of the RF signal by homodyne detection.

In FIGS. 6A and 6B, FIG. 6A shows the case in which the reference light in phase with the signal light Sig corresponding to the code "1" (represented as Ref_0°) interferes with the signal light Sig. FIG. 6B shows the case in which the reference light in anti-phase with the signal light Sig corresponding to the code "1" (represented as Ref_180°) interferes with the signal light Sig.

In these FIGS. 6A and 6B, the electric field vector of the signal light Sig and the homodyne measurement axis by optical path length servo are shown on the quadrature phase space. Just for the record, the term "homodyne measurement axis by optical path length servo" used here means the homodyne measurement axis when the optical path length servo control is so carried out that the RF signal is maximized.

FIG. 6A shows the electric field vector of the detection result hm1 when the signal light Sig of the code "1" and the reference light Ref_0° interfere with each other. FIG. 6B shows the electric field vector of the detection result hm2 when the signal light Sig of the code "1" and the reference light Ref_180° interfere with each other.

In FIGS. 6A and 6B, the direction of the homodyne measurement axis is just the opposite between the case of interference with the reference light Ref_0° shown in FIG. 6A and the case of interference with the reference light Ref_180° shown in FIG. 6B. This is because the interfering reference light Ref is in the opposite phase relationship.

In FIG. 6A, the direction of the homodyne measurement axis in the case of interference with the reference light Ref_0° is so shown as to correspond with the direction of the electric field vector of the signal light Sig. However, as described above, the optical path length servo control is so carried out that the optical path length error signal averaged via the low-pass filter 63 is set to "0." Therefore, actually the direction of the homodyne measurement axis does not correspond with the direction of the electric field vector of the signal light Sig. Specifically, the direction of the homodyne measurement axis substantially corresponds with the direction of the electric field vector of the intermediate component between the signal light Sig of the code "0" and the signal light Sig of the code "1." For convenience of the following description, the direction of the homodyne measurement axis is so shown as to correspond with the direction of the electric field vector of the signal light Sig in FIG. 6A.

This applies also to the case of FIG. 6B. Actually, the direction of the homodyne measurement axis in FIG. 6B is just opposite to not the direction of the electric field vector of the signal light Sig shown in the diagram but the direction of the electric field vector of the above-described intermediate component.

In the homodyne detection, the electric field of the signal light is multiplied by the magnitude of the electric field of the reference light and thereafter the magnitude of the vector resulting from projection onto the measurement axis (homodyne measurement axis) possessed by the reference light is measured, as is well known also in the fields of e.g. optical communication and quantum communication.

Specifically, about the component obtained by the interference of the reference light Ref_0° with the signal light Sig, it can be considered that a component like that represented as "hm1" in the diagram is detected on the detector. Furthermore, about the component obtained by the interference of the reference light Ref_180° with the signal light Sig, it can be considered that a component like that represented as "hm2" in the diagram is detected.

If the light reception signals D_hm1 and D_hm2 detected by the homodyne detection are represented by expressions, the following expressions are obtained.

In the following [Equation 1] and [Equation 2], the electric field of the signal light after transmission through the beam splitter 28 is defined as $\frac{1}{2}|E_{sig}|$ and the electric field of the reference light is defined as $\frac{1}{2}|E_{ref}|$ under the premise that the beam splitter 28 reflects 50% of incident light and transmits 50%.

$$D\_hm1 = \tfrac{1}{4}|E_{sig}|^2 + \tfrac{1}{4}|E_{ref}|^2 + \tfrac{1}{2}|E_{sig}||E_{ref}|\cos(\Delta\phi) \quad \text{[Equation 1]}$$

$$D\_hm2 = \tfrac{1}{4}|E_{sig}|^2 + \tfrac{1}{4}|E_{ref}|^2 - \tfrac{1}{2}|E_{sig}||E_{ref}|\cos(\Delta\phi) \quad \text{[Equation 2]}$$

In these [Equation 1] and [Equation 2], the first term and the second term in the right side are the square-law detection signal of the signal light and the square-law detection signal of the reference light, respectively. The third term is the interference signal of the signal light and the reference light by homodyne (i.e. signal desired to be extracted).

In the present example, differential detection about the light reception signals D_hm1 and D_hm2 is performed and thus the result is represented by the following expression.

$$D\_hm1 - D\_hm2 = |E_{sig}||E_{ref}|\cos(\Delta\phi) \quad \text{[Equation 3]}$$

From this [Equation 3], it turns out that, the component other than the homodyne signal, such as the reference light ($|E_{ref}|^2$), is removed and the signal light amplified depending on the intensity of the reference light is extracted by the reproduction operation by the homodyne detection (and differential detection).

The reason why the electric field vector of the reference light is not represented in FIGS. 6A and 6B is because the square-law detection signal component of the reference light is cancelled out to disappear in the reproduction operation by the homodyne detection as described above.

The RF signal obtained by the reproduction operation by the homodyne system in this manner can be considered as the signal obtained by amplifying the original signal light depending on the light intensity of the reference light.

[1-5. Variation in Reproduced Signal Amplitude Due to Mark Size Variation]

Also as described above, particularly in the case of employing the void recording system, in which a vacancy mark is recorded, as the bulk recording system like the present example, possibly variation arises in the recorded mark size attributed to e.g. the characteristics of the laser for recording.

In the bulk recording system, the recorded mark serves as a reflector and therefore the variation in its size leads to the occurrence of the difference in the amount of reflected light. Because of the occurrence of the difference in the amount of reflected light due to the mark size difference, a difference arises also in the reproduced signal amplitude (reproduced signal amplitude at the mark part), which should be detected with the same level originally. Attributed to this difference, possibly the reproduction performance is deteriorated.

Figures 7A, 7B:
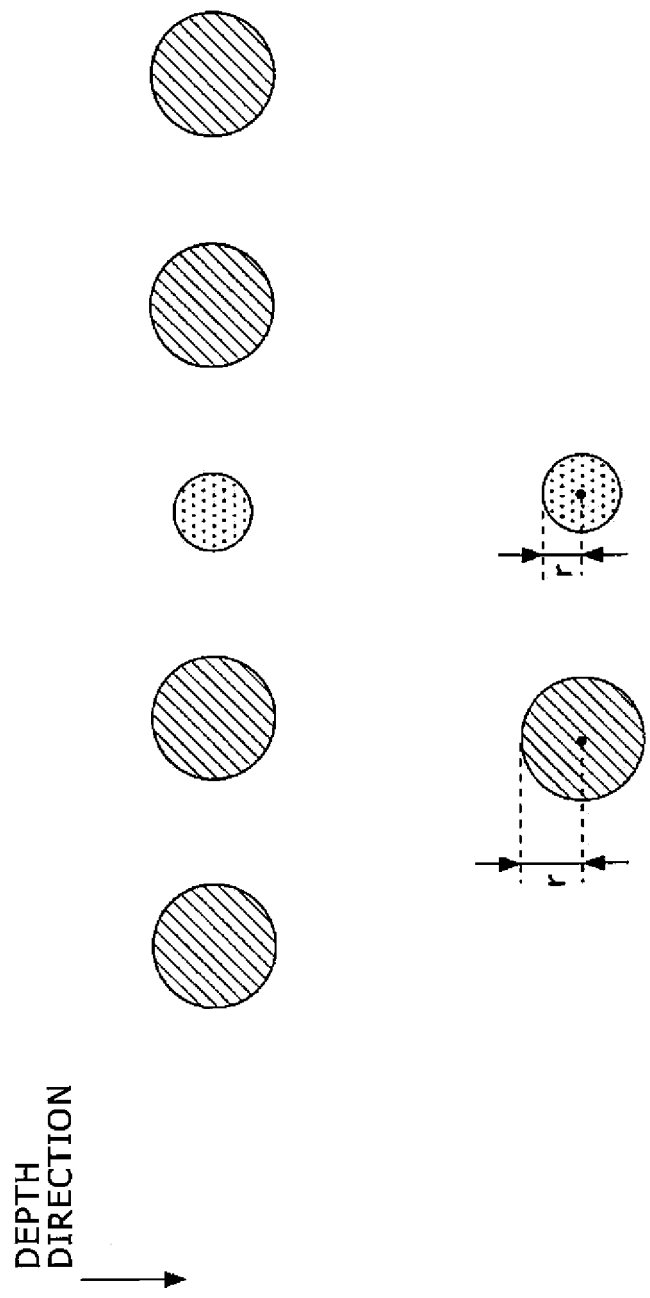
FIGS. 7A and 7B are diagrams for explaining a specific form of variation in the recorded mark size.

FIGS. 7A and 7B are diagrams for explaining a specific form of the variation in the recorded mark size.

In FIGS. 7A and 7B, FIG. 7A schematically shows a specific form of the mark size variation generated in a mark sequence recorded in a certain information recording layer position L. As shown in FIG. 7A, as one form of the mark size variation, for example a mark having a size (size of the mark indicated as the screen part in the diagram) smaller than the normal size (size of the mark indicated as the hatched part in the diagram) is locally formed. Alternatively, it is also possible that a mark having a size larger than the normal size is locally formed conversely.

In the bulk recording, the recorded mark is formed with a three-dimensional spread around the focal position of laser light. Therefore, the difference in the mark size can be translated into the difference in the radius r of the mark (distance from the mark center to the mark end in the direction parallel to the depth direction) as shown in FIG. 7B.

Figure 8:
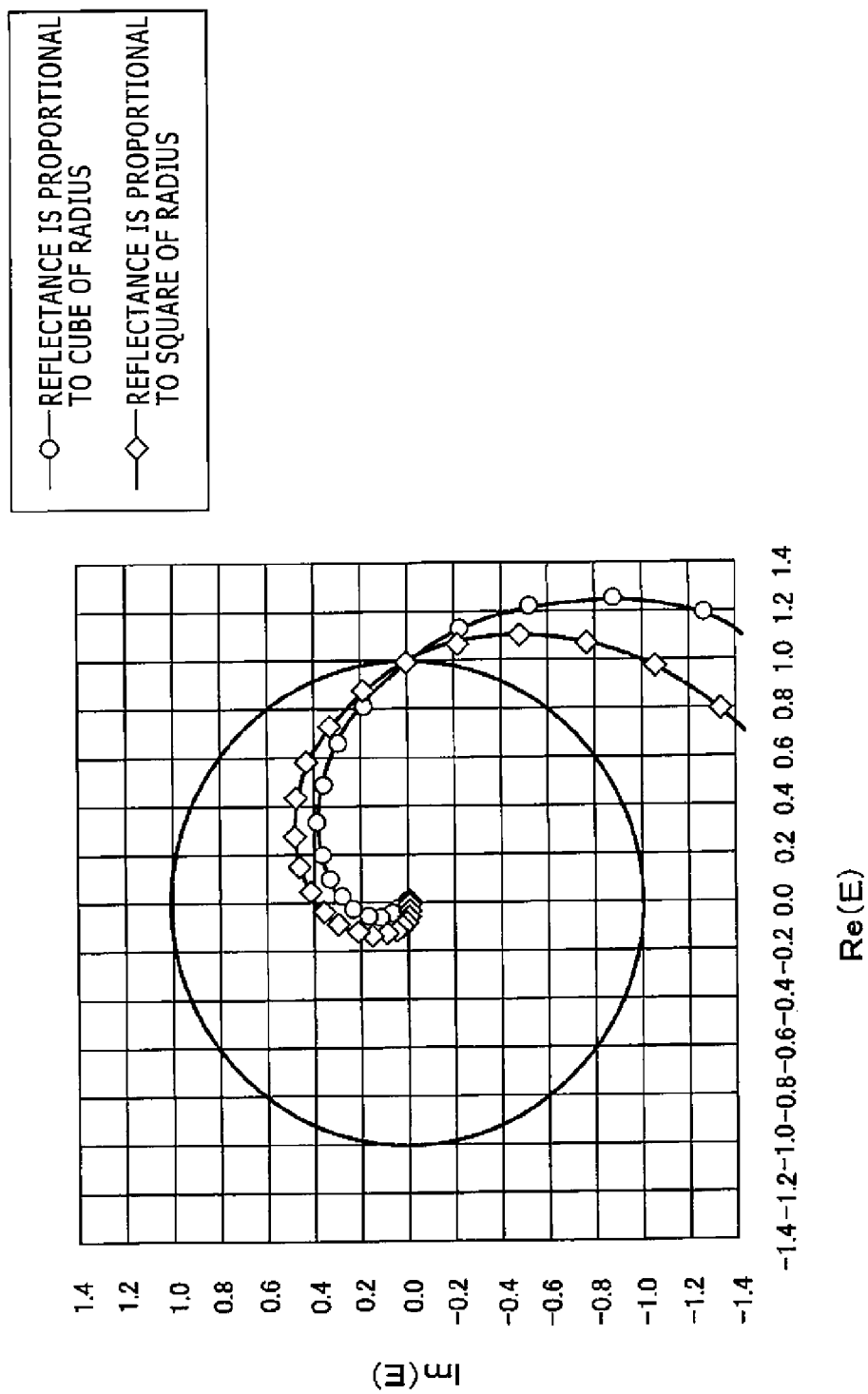
FIG. 8 is a diagram showing the distribution of the electric field intensity of mark reflected light when the recorded mark size is changed in a quadrature phase space.

FIG. 8 is a diagram showing the distribution of the electric field intensity of mark reflected light when the recorded mark size is changed in a quadrature phase space.

In FIG. 8, the electric field intensity of the reflected light when a vacancy mark having a size equivalent to the shortest mark length in the BD is formed is normalized to one and the phase at this time is defined as zero.

Furthermore, FIG. 8 shows the calculation result of the distribution of the electric field intensity of the mark reflected light when the recorded mark size is changed with 10 nm increments in the range of 0 nm to 260 nm.

First, as a premise, the reflectance of the mark can be regarded as being proportional to the surface area of the mark.

Under this premise, in FIG. 8, a calculation result when it is assumed that the mark reflectance is proportional to the square of the radius r (area) is shown by plotting of a white rhomboid mark in the diagram. From this result, it can be understood that the electric field intensity of the mark reflected light (i.e. amplitude of signal light) changes due to variation in the mark size.

Furthermore, in FIG. 8, a calculation result when it is assumed that the mark reflectance is proportional to the cube of the radius r (volume) is shown by plotting of a white circle mark. From this calculation result in FIG. 8, it turns out that the electric field intensity of the mark reflected light changes due to the mark size variation also when it is assumed that the mark reflectance is proportional to the mark volume.

According to FIG. 8, it turns out that the phase of the signal light also changes due to the mark size variation. This means that the direction of the electric field vector of the signal light Sig shown in FIGS. 5A to 6B changes due to the difference in the mark size.

If it is assumed that the radius r changes by $\Delta r$ as the mark size variation, the optical path length of the signal light changes by $2\Delta r$ in consideration of both the forward and return paths. If this is transformed to the phase difference, the phase difference is "$4\Delta r\pi/n\lambda$," in which $\lambda$ denotes the wavelength of the laser light and n denotes the refractive index of the recording medium.

In this manner, the amplitude of the signal light changes due to the size variation of the recorded mark.

Furthermore, in linkage with this, change occurs also in the RF signal amplitude.

Just for the record, the size variation of the recorded mark, described thus far, means a size variation that locally arises.

If the size variation gradually arises with a certain time width, there is no possibility that variation in the RF signal amplitude arises. This is because optical path length servo control is carried out. Specifically, if the size variation gradually arises, the homodyne measurement axis is so adjusted as to be parallel to the electric field vector of the signal light Sig as shown in FIGS. 6A and 6B by the optical path length servo and thus the variation in the RF signal amplitude associated with size variation does not arise.

As is understood also from this, the mark size variation mentioned here means mark size variation that arises so locally (at such a high speed) that the optical path length servo cannot follow up the variation.

[1-6. Giving of Offset]

In order to prevent the deterioration of the reproduction performance attributed to variation in the RF signal amplitude associated with the above-described local mark size variation, the present embodiment employs a technique of adjusting the homodyne measurement axis to thereby reduce the difference in the detection intensity of reflected light from marks having the respective sizes. That is, in this technique, the difference in the RF signal amplitude associated with the mark size variation is reduced by giving an offset to the optical path length servo loop.

Figure 9A:
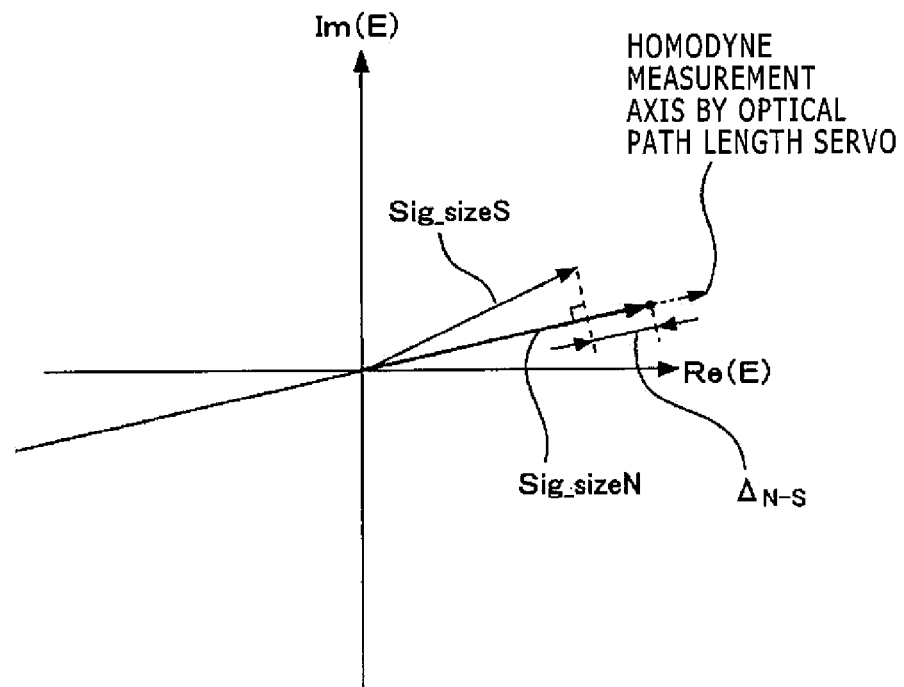
FIGS. 9A and 9B are diagrams for explaining the principle of how the difference in the RF signal amplitude associated with mark size variation is reduced by offset giving to an optical path length servo loop.
Figure 9B:
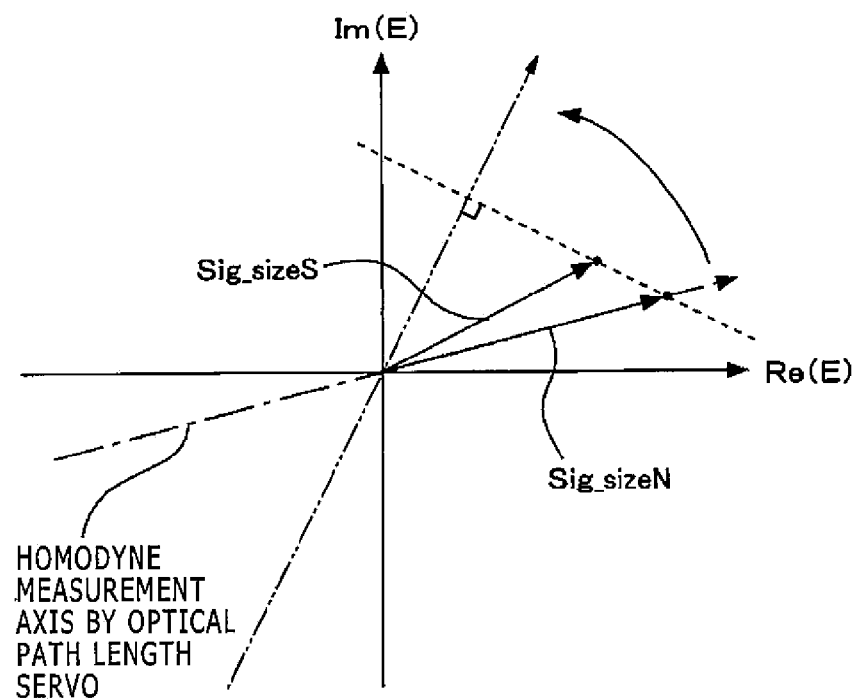

FIGS. 9A and 9B are diagrams for explaining the principle of how the difference in the RF signal amplitude associated with mark size variation is reduced by giving an offset to the optical path length servo loop.

This case is premised on that the electric field intensity of the reference light is always constant.

First, FIG. 9A shows the relationship among the electric field vector of the signal light Sig of a mark having the normal size (represented as Sig_sizeN), the electric field vector of the signal light Sig of a mark having a size smaller than the normal size (represented as Sig_sizeS), and the homodyne measurement axis by optical path length servo, on a quadrature phase space.

In addition to FIG. 9A, in FIG. 9B and FIGS. 10A and 10B to be described later, diagrammatic representation of the electric field vector of the reference light Ref is omitted similarly to the case of FIGS. 6A and 6B.

As is understood also from the above description with FIG. 8, a difference arises in the electric field intensity and phase of reflected light due to the difference in the mark size. This point is shown in FIG. 9A. Specifically, the signal light Sig_sizeS of the smaller-size mark has electric field intensity lower than that of the signal light Sig_sizeN of the normal-size mark, and has a phase retarded with respect to the phase of the signal light Sig_sizeN of the normal-size mark.

Furthermore, as described above, servo control is so carried out that the RF signal amplitude is maximized by the optical path length servo. At this time, the target value in the servo control can be considered as the RF signal amplitude value about the mark having the normal size (because mark size variation locally arises). Under this premise, here the homodyne measurement axis is so shown that its direction corresponds with the direction of the electric field vector of the signal light Sig_sizeN as shown in the diagram.

As mentioned above with FIGS. 6A and 6B, because the optical path length error signal is generated via the low-pass filter 63, actually the direction of the homodyne measurement axis substantially corresponds with the direction of the electric field vector of the intermediate component between the signal light Sig of the code "1" (in this case, signal light Sig_sizeN of the normal-size mark) and the signal light Sig of the code "0." The purpose of making the direction of the homodyne measurement axis correspond with the direction of the electric field vector of the signal light Sig_sizeN is to avoid complexity of the diagram.

As described above, in the homodyne detection, the component resulting from projection onto the homodyne measurement axis is detected. Thus, according to the relationship among the homodyne measurement axis and the respective electric field vectors in the diagram, the detection intensity of the signal light Sig_sizeS of the smaller-size mark is lower than the electric field intensity originally possessed by the signal light Sig_sizeS. In contrast, the detection intensity of the signal light Sig_sizeN of the normal-size mark is equal to the electric field intensity originally possessed by this signal light Sig_sizeN.

In this manner, a detection intensity difference (RF signal amplitude difference) $\Delta_{N\text{-}S}$ between the normal-size mark and the smaller-size mark arises in such a manner that the intensity difference attributed to the deviation of the homodyne measurement axis is added to the intensity difference originally possessed by the signal light Sig_sizeN and the signal light Sig_sizeS.

According to the above description, it turns out that the amplitude difference $\Delta_{N\text{-}S}$ depends on the direction (angle) of the homodyne measurement axis.

In view of this point, in the present embodiment, as shown in FIG. 9B, the angle of the homodyne measurement axis is changed from the direction of the homodyne measurement axis by optical path length servo (one-dot chain line in the diagram) to thereby reduce the RF signal amplitude difference $\Delta_{N\text{-}S}$, which can be regarded as the difference between the components resulting from projection onto the homodyne measurement axis about the normal-size mark and the smaller-size mark. In other words, the angle of the homodyne measurement axis is shifted from the angle of the measurement axis by optical path length servo in such a manner that the RF signal amplitude difference $\Delta_{N\text{-}S}$ between these normal-size mark and smaller-size mark is reduced.

In FIG. 9B, an example in which the RF signal amplitude difference $\Delta_{N\text{-}S}$ between the normal-size mark and the smaller-size mark is minimized is shown as a specific example about the shift of the homodyne measurement axis.

As is apparent from the diagram, the angle of the homodyne measurement axis to minimize the amplitude difference $\Delta_{N\text{-}S}$ on the quadrature phase space can be obtained as the angle of the straight line perpendicular to the straight line passing through the following two points: the point specified by the electric field vector of the signal light Sig_sizeN of the normal-size mark and the point specified by the electric field vector of the signal light Sig_sizeS of the smaller-size mark.

It turns out that, in FIG. 9B, the angle difference between the homodyne measurement axis by optical path length servo shown by a one-dot chain line and the homodyne measurement axis after the adjustment shown by a two-dot chain line is synonymous with the difference of the target value (control target value) set in the optical path length servo system. Thus, the angle difference is synonymous with the optical path length difference (phase difference) between the signal light and the reference light.

Therefore, in the present embodiment, an offset value based on the value equivalent to this angle difference of the homodyne measurement axis is given to the optical path length servo loop. This can reduce the RF signal amplitude difference $\Delta_{N\text{-}S}$.

According to FIG. 9B, it turns out that the offset value for reducing the RF signal amplitude difference $\Delta_{N\text{-}S}$ in this case is an offset value toward such a direction as to retard the phase of the reference light.

For example the following technique can be used as the technique for deriving the specific offset value that should be given to the optical path length servo loop.

First, the angle of the homodyne measurement axis for reducing the RF signal amplitude difference $\Delta_{N\text{-}S}$ is obtained by e.g. a technique of obtaining the angle of the straight line perpendicular to the straight line passing through two points specified by the electric field vectors of the signal light Sig_sizeN and the signal light Sig_sizeS like the above-exemplified one.

If this angle is obtained, the value of the phase difference (and the polarity thereof) that should be given between the signal light and the reference light by the optical path length servo system can be obtained. Thus, the offset value that can give this phase difference is obtained. Specifically, information (e.g. table or function) representing the relationship between the offset value given to the optical path length servo loop and the phase difference given between the signal light and the reference light by this offset value is obtained in advance, and the offset value that can give the phase difference obtained in the above-described manner is obtained from this information.

The above description is premised on that mark size variation arises in such a manner that only a mark having a size smaller than the normal size is formed. However, it will also be possible that mark size variation arises in such a manner that a mark having a size larger than the normal size is formed.

Also in this case, the offset value for reducing the RF signal amplitude difference is obtained based on the same concept as that of the case of FIGS. 9A and 9B.

This point will be described below with reference to FIGS. 10A and 10B.

Figure 10A:
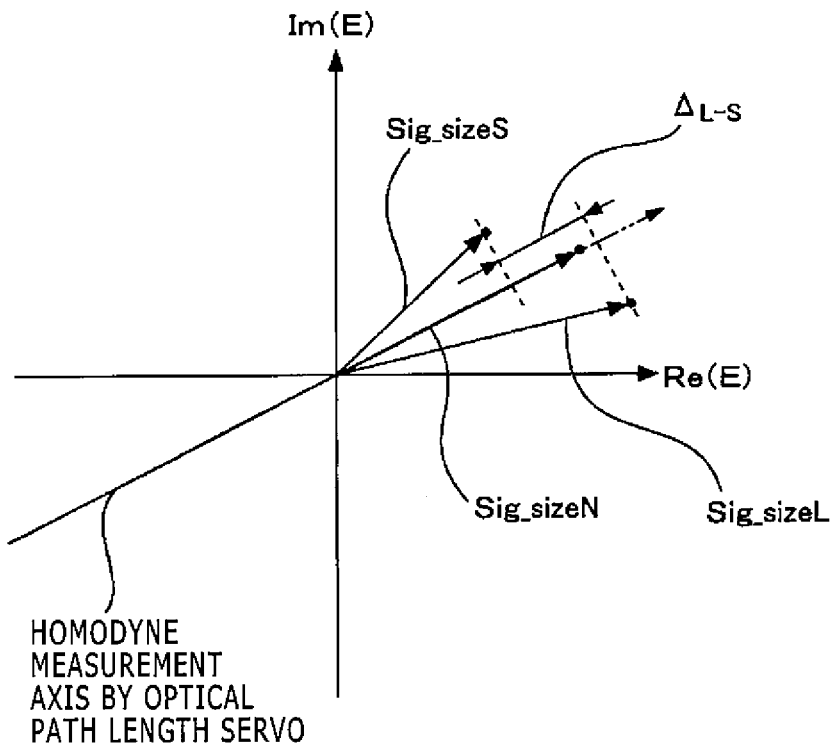
FIGS. 10A and 10B are diagrams for explaining how to obtain an offset value in the case in which it is assumed that a mark having a size larger than a normal-size mark is also formed as the mark size variation.
Figure 10B:
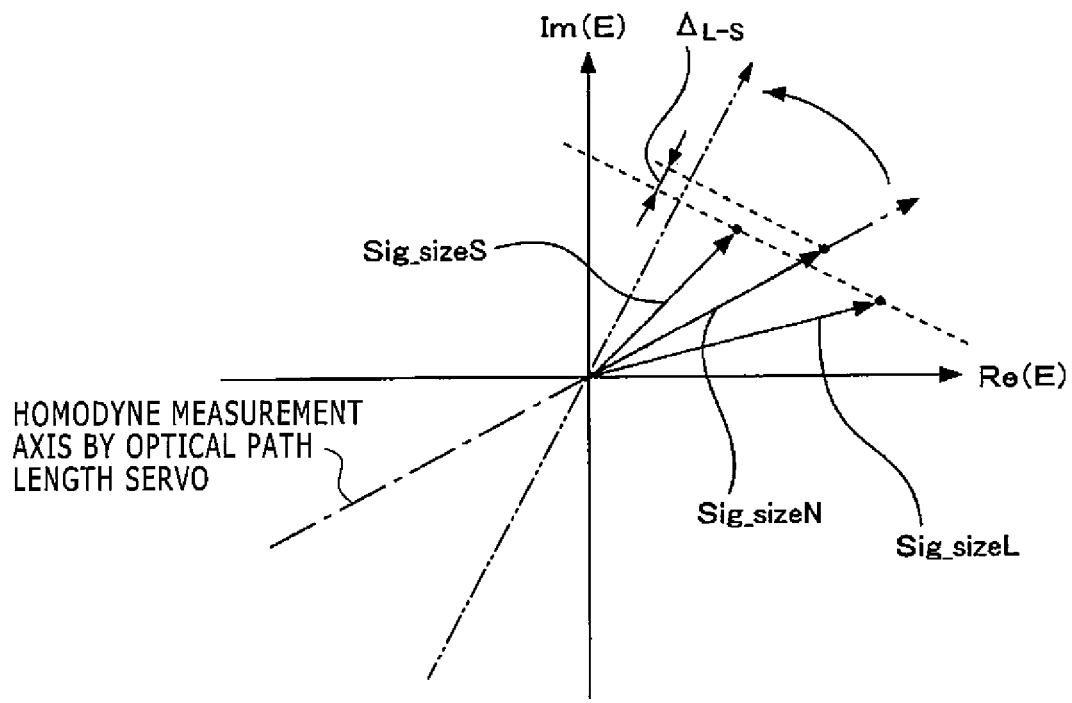

In FIGS. 10A and 10B, FIG. 10A shows the relationship among the electric field vector of the signal light Sig_sizeN of the normal-size mark, the electric field vector of the signal light Sig_sizeS of the smaller-size mark, and the electric field vector of signal light Sig_sizeL of a larger-size mark larger than the normal size, and the homodyne measurement axis by optical path length servo, on a quadrature phase space.

According to FIG. 8, the signal light Sig_sizeL of the larger-size mark has electric field intensity higher than that of the signal light Sig_sizeN of the normal-size mark, and has a phase advanced with respect to the phase of the signal light Sig_sizeN.

Furthermore, because mark size variation locally arises as described above, the homodyne measurement axis by optical path length servo is so shown that its direction corresponds with the direction of the electric field vector of the signal light Sig_sizeN of the mark having the normal size also in this case (for preventing complexity of the diagram).

According to such a relationship among the homodyne measurement axis and the respective electric field vectors, the RF signal amplitude difference between the RF signal amplitude of the signal light Sig_sizeL of the larger-size mark and the RF signal amplitude of the smaller-size mark, which can be regarded as components resulting from projection onto the homodyne measurement axis, is $\Delta_{L\text{-}S}$ in the diagram.

In order to reduce this amplitude difference $\Delta_{L\text{-}S}$, adjustment of the homodyne measurement axis shown in FIG. 10B is performed.

In this case, the relationship among the electric field vectors is not the relationship between two kinds of size, i.e. the normal size and the smaller size, and thus it is impossible to set the RF signal amplitude difference to zero, differently from the above-described case of FIGS. 9A and 9B. Therefore, for example such an angle of the homodyne measurement axis as to set the RF signal amplitude difference between the smaller-size mark and the larger-size mark to zero is set as shown in the diagram.

This makes it possible to minimize the amplitude difference between the RF signal amplitude of the smaller-size mark and the RF signal amplitude of the larger-size mark.

In the above description, the angle of the homodyne measurement axis (and therefore offset value) is derived with priority given to the minimization of the RF signal amplitude difference. However, if the offset value given to the optical path length servo loop is too large, it is difficult to achieve stable servo control. Therefore, actually the offset value should be set in consideration of this point. For example, if the offset value that is so obtained as to minimize the RF signal amplitude difference by the above-described technique is given, the case in which the angle difference between the "homodyne measurement axis by optical path length servo" (one-dot chain line) and the homodyne measurement axis after the offset giving (two-dot chain line), shown in FIG. 9B and so forth, is substantially equal to or larger than 45° is equivalent to the state in which servo control is carried out at a position outside the linear interval of the optical path length error signal (FIG. 4B). Thus, it is practically impossible to carry out stable servo control. Therefore, in such a case, the offset value that gives as small RF signal amplitude difference as possible is set within such a range that stability of servo control can be ensured.

In view of this point, it can be said that any value may be set as the offset value that should be given to the optical path length servo loop as long as it is such a value that at least the RF signal amplitude difference can be reduced.

Also as described above, for adjustment of the homodyne measurement axis for reducing the RF signal amplitude difference attributed to mark size variation, a predetermined offset value is given to the optical path length servo loop.

For this purpose, in the reproducing device of the present embodiment shown in FIG. 3, the adder 64 is provided between the low-pass filter 63, which generates the optical path length error signal, and the optical path length servo circuit 65.

This adder 64 adds a predetermined offset value set in advance to the optical path length error signal input from the low-pass filter 63, and outputs the result to the optical path length servo circuit 65. Specifically, this predetermined offset value is an offset value that is so obtained that the RF signal amplitude difference attributed to mark size variation can be at least reduced by the above-described derivation technique.

The configuration of the reproducing device as such an embodiment can reduce the RF signal amplitude difference due to mark size variation and obtain more favorable reproduction performance.

As is apparent from reference to FIGS. 9A to 10B, if the RF signal amplitude difference is reduced by the technique of the present embodiment, the intensity of the RF signal amplitude tends to be lowered compared with the case in which this reduction is not performed.

If this lowering of the RF signal amplitude due to the technique of the present embodiment is problematic, it is possible to respond to the problem by increasing the signal amplification factor (i.e. the amount of reference light) by homodyne detection.

2. Second Embodiment

[2-1. Configuration of Reproducing Device]

A second embodiment of the present disclosure will be described below.

Figure 11:
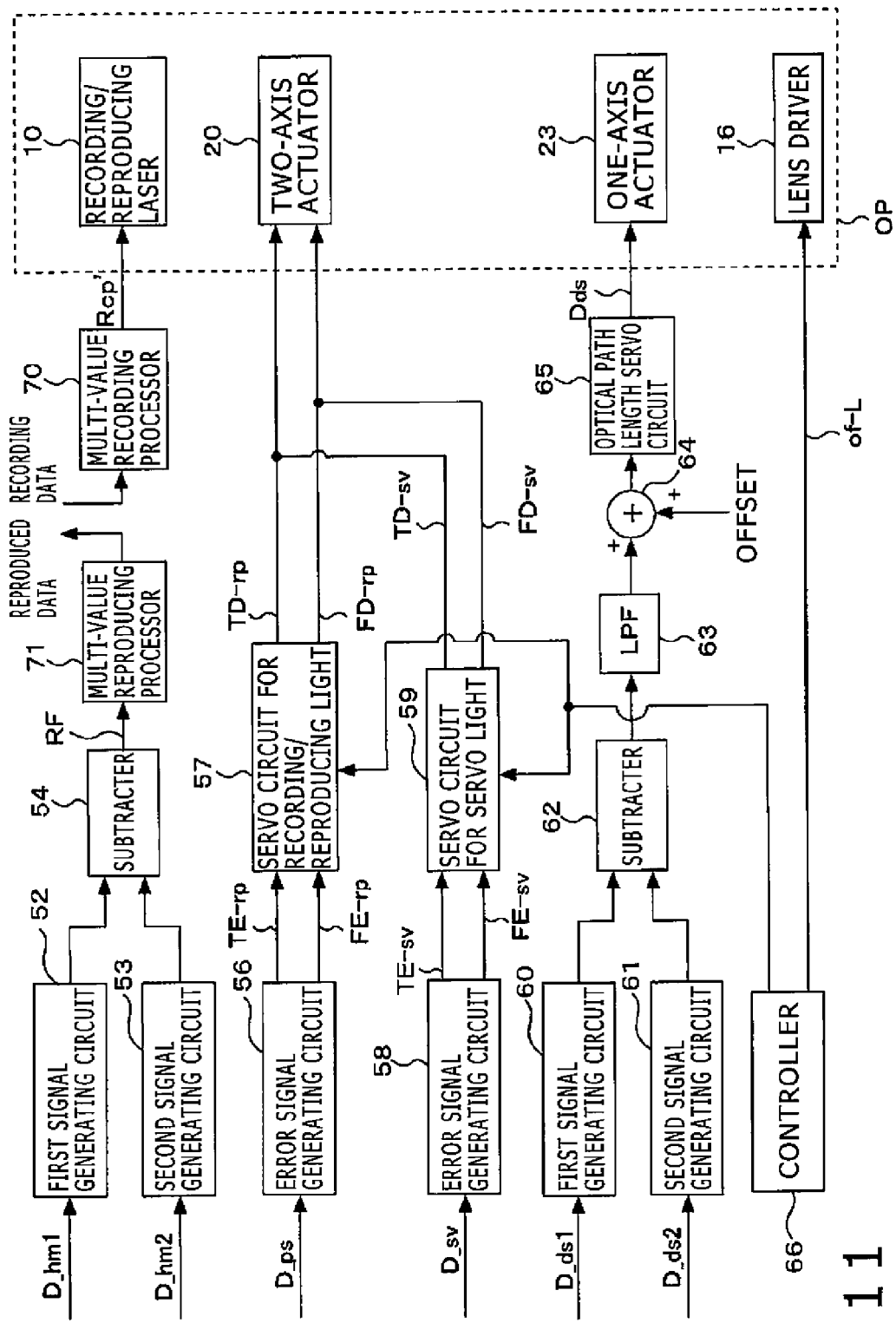
FIG. 11 is a diagram for explaining the internal configuration of the whole of a reproducing device as a second embodiment of the present disclosure.

FIG. 11 is a diagram showing the internal configuration of the whole of a reproducing device as the second embodiment.

In the second embodiment, the internal configuration of an optical pick-up OP is the same as that in the first embodiment and therefore describing the configuration by diagrammatic representation again is omitted.

Also in FIG. 11, only the recording/reproducing laser 10, the lens driver 16, the two-axis actuator 20, and the one-axis actuator 23 are picked out and shown regarding the configuration in the optical pick-up OP similarly to FIG. 3.

Furthermore, diagrammatic representation of the spindle motor 50 is omitted also in FIG. 11 similarly to FIG. 3.

In FIG. 11, the part that has been already described for the first embodiment is given the same numeral or symbol and description thereof is omitted.

As is apparent from comparison with FIG. 3, in the reproducing device of the second embodiment, a multi-value recording processor 70 is provided instead of the recording processor 51 included in the reproducing device of the first embodiment, and a multi-value reproducing processor 71 is provided instead of the reproducing processor 55.

The multi-value recording processor 70 executes multi-value modulation processing for input recording data and generates a recording pulse signal Rcp' based on a multi-value code sequence obtained by this multi-value modulation processing. Furthermore, the multi-value recording processor 70 drives the recording/reproducing laser 10 for its light emission based on this recording pulse signal Rcp'.

Figures 12A, 12B, 12C:
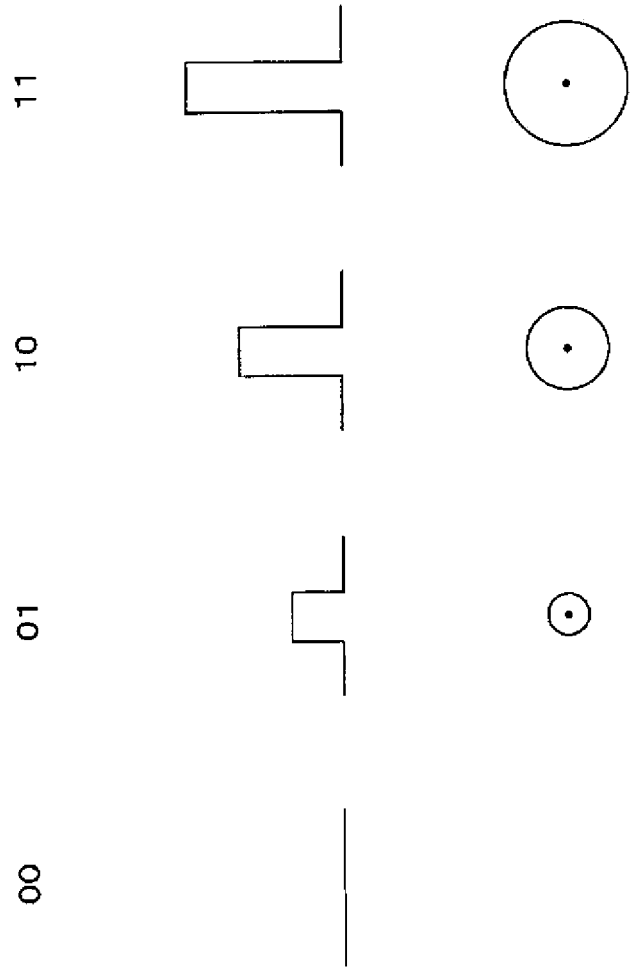
FIGS. 12A to 12C are diagrams for explaining a specific example of multi-value recording.

FIGS. 12A to 12C are diagrams for explaining a specific example of multi-value recording realized by the multi-value modulation processing by the multi-value recording processor 70.

In FIGS. 12A to 12C, FIG. 12A shows the kinds of multi-value codes obtained by the multi-value modulation processing of this case. FIG. 12B shows the kinds of recording pulses corresponding to the respective multi-value codes. FIG. 12C shows the kinds of recorded marks corresponding to the respective multi-value codes.

First, as is apparent from reference to FIGS. 12A to 12C, the multi-value modulation of this case is multi-value modulation from binary values ("0," "1") to quaternary values ("00," "01," "10," "11").

As shown in the diagram, the amplitude of the recording pulse of each multi-value code is so set as to be the smallest for "00" and gradually increase in order of "01," "10," and "11."

Due to this setting, no mark is formed for the code "00" and a small-size mark is formed for the code "01." In addition, a middle-size mark is formed for the code "10" and a large-size mark is formed for the code "11."

In this manner, the multi-value recording of this case is so performed that the size of the mark formed for each code is modulated.

Referring back to FIG. 11, in association with the multi-value recording based on the above-described mark size modulation, the RF signal of this case has the same number of amplitude levels as the number of multi-value codes, as its amplitude level.

The multi-value reproducing processor 71 determines the kind of multi-value code from the RF signal and executes processing of demodulation from the multi-value to the binary value based on the determination result, to obtain reproduced data arising from restoration of the recording data.

[2-2. Giving of Offset]

Also in the case of performing multi-value recording based on the above-described mark size modulation, it is expected that control of the mark size is difficult for the same reason as that of the first embodiment. Thus, possibly the size differences among the respective marks are not constant and it is difficult to sufficiently ensure the differences in the RF signal amplitudes of the marks. That is, as a result, possibly the lowering of the multi-value reproduction performance (performance of discrimination of the respective values) is caused.

In view of this point, it is preferable that the difference in the RF signal amplitude about the marks with the respective sizes can be highlighted in multi-value recording.

So, in the second embodiment, an offset is given to the optical path length servo loop in such a manner that the homodyne measurement axis is changed to such a direction that the RF signal amplitude difference is highlighted.

Figure 13A:
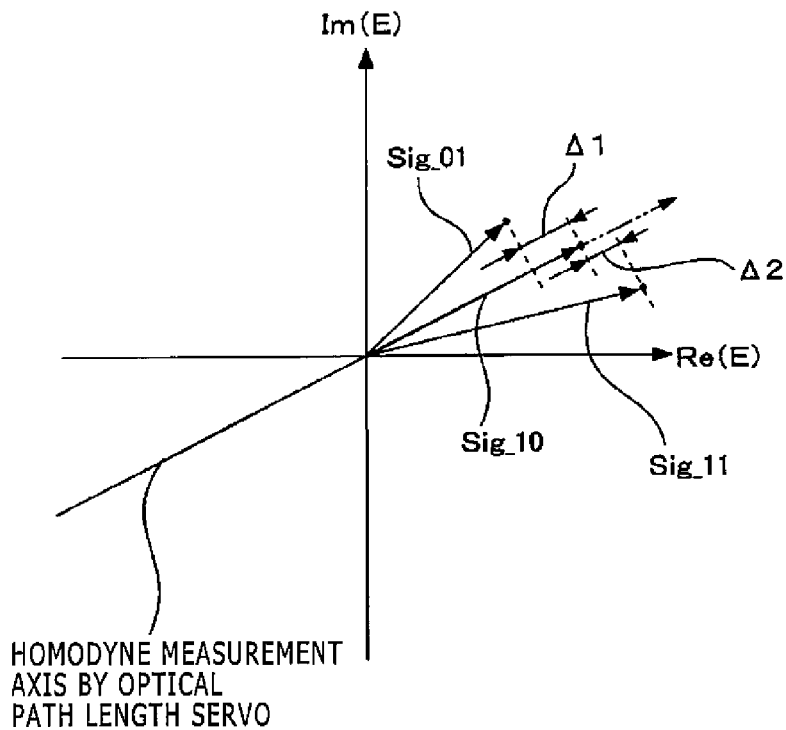
FIGS. 13A and 13B are diagrams for explaining offset giving in the second embodiment.
Figure 13B:
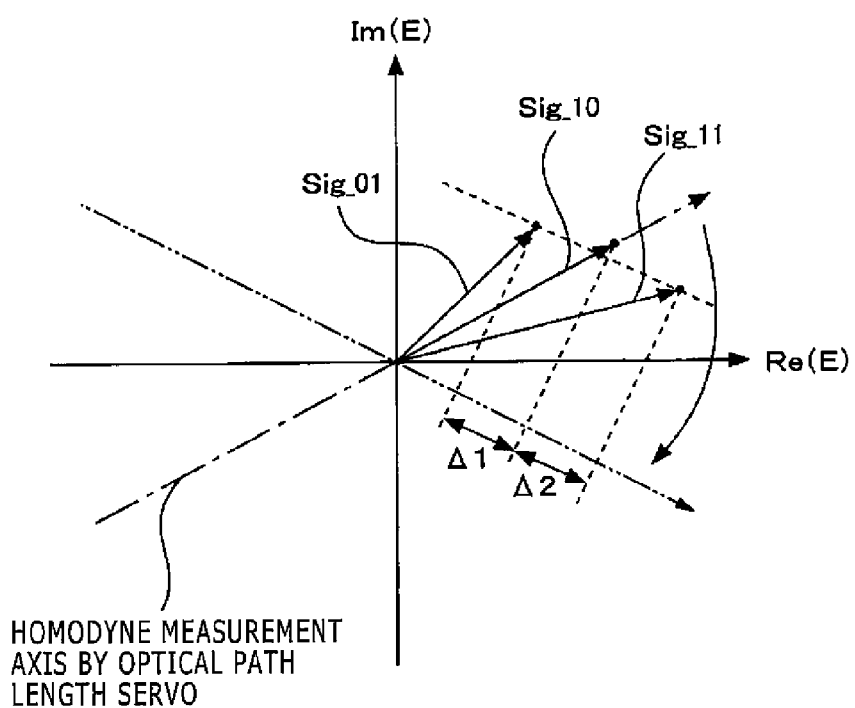

FIGS. 13A and 13B are diagrams for explaining the offset giving in the second embodiment.

In FIGS. 13A and 13B, FIG. 13A shows the relationship among the electric field vector of signal light Sig about the mark corresponding to the code "01" (defined as Sig_01), the electric field vector of signal light Sig about the mark corresponding to the code "10" (defined as Sig_10), the electric field vector of signal light Sig about the mark corresponding to the code "11" (defined as Sig_11), and the homodyne measurement axis by optical path length servo, on a quadrature phase space. FIG. 13B shows the relationship among these respective electric field vectors and the homodyne measurement axis after the offset giving on the quadrature phase space similarly.

Also in FIGS. 13A and 13B, diagrammatic representation of the electric field vector of the reference light Ref is omitted for convenience of diagrammatic representation.

Furthermore, in FIGS. 13A and 13B, the sizes of the respective marks of the codes "01," "10," and "11" are their ideal sizes.

First, the size of the respective marks of the codes "01," "10," and "11" becomes larger in that order as described above. Thus, the electric field intensity of the signal light Sig of them also becomes higher in the same order, and the phase is gradually advanced in the same order.

In this case, the homodyne measurement axis by optical path length servo (control target value=0) is shown with the direction corresponding with the direction of the electric field vector of the signal light Sig_10 of the mark of the code "10" as shown in FIG. 13A for prevention of complexity of the diagram.

The mark size change associated with multi-value recording is not local. Furthermore, the optical path length servo control of this case is also carried out based on the optical path length error signal equivalent to a signal resulting from averaging (LPF) of the RF signal. From these points, the actual direction of the homodyne measurement axis by optical path length servo substantially corresponds with the direction of the electric field vector of the intermediate component between the signal light Sig_11 about the mark corresponding to the code "11" having the maximum amplitude and the signal light Sig corresponding to the code "00."

According to the relationship among the homodyne measurement axis and the respective electric field vectors in the diagram, the RF signal amplitude difference between the mark of the code "01" and the mark of the code "10" in the case of FIG. 13A is represented by $\Delta 1$ in the diagram. Furthermore, the RF signal amplitude difference between the mark of the code "10" and the mark of the code "11" is represented by $\Delta 2$ in the diagram.

In the second embodiment, the homodyne measurement axis is changed as shown in FIG. 13B from the state shown in FIG. 13A by offset giving to the optical path length servo loop.

Specifically, in contrast to the first embodiment, in which an offset of such a direction as to retard the phase of the reference light is given for reducing the RF signal amplitude difference attribute to the mark size difference, an offset of such a direction as to advance the phase of the reference light conversely is given in the present embodiment.

In FIG. 13B, as a specific example of the shift of the homodyne measurement axis by such offset giving, an example in which the RF signal amplitude difference between the mark of the code "01" and the mark of the code "11" ($\Delta 1 + \Delta 2$) is maximized is shown.

The angle of the homodyne measurement axis (i.e. phase difference of reference light from signal light) in this case is obtained as the angle of the straight line perpendicular to the straight line passing through the following two points: the point specified by the electric field vector of the signal light Sig_01 of the mark of the code "01" and the point specified by the electric field vector of the signal light Sig_11 of the mark of the code "11."

In this manner, the offset giving is so performed as to maximize the RF signal amplitude difference ($\Delta 1 + \Delta 2$) between the mark of the code "01" with the smallest size among the marks that are possibly formed by multi-value recording and the mark of the code "11" with the largest size. This can enlarge the RF signal amplitude differences $\Delta$ ($\Delta 1$ and $\Delta 2$, in this case) among the respective marks to the maximum extent.

From reference to FIGS. 13A and 13B, it turns out that $\Delta 1$ and $\Delta 2$ are enlarged if the homodyne measurement axis is changed even slightly from the state at the time of optical path length servo control (target value=0) in such a direction as to advance the phase. As is understood also from this fact, such an offset as to at least advance the phase of the reference light is given for enlargement of the RF signal amplitude differences among the respective marks.

Also in this case, for example if the value of the phase difference of the reference light for enlarging the RF signal amplitude difference is obtained by the above-described derivation technique based on the angle of the homodyne measurement axis, the offset value that should be given to the optical path length servo loop can be obtained by a technique similar to that of the first embodiment based on this value of the phase difference.

In the reproducing device of the second embodiment, the offset value thus obtained is set in advance.

Specifically, in the reproducing device of the second embodiment shown in FIG. 11, the offset value set in advance in the above-described manner (i.e. offset value that is so obtained that at least the RF signal amplitude differences among the respective marks can be enlarged) is input to the adder 64. This allows the offset value to be added to the optical path length error signal output from the low-pass filter 63.

Due to such a configuration, the RF signal amplitude differences among the respective marks can be enlarged even when the sizes of the respective marks formed in multi-value recording vary. As a result, the accuracy of multi-value determination in the multi-value reproducing processor 71 can be enhanced and the reproduction performance can be enhanced.

<3. Modification Examples>

Although the respective embodiments of the present disclosure have been described above, the present disclosure should not be limited to the above-described specific examples.

For example, as the configuration of the optical system, a configuration considered as the optimum configuration may be accordingly employed depending on the actual embodiment. The configuration can be accordingly changed within the range of the present disclosure.

In the above description, the case in which the offset giving for reduction/enlargement of the RF signal amplitude difference is performed for the optical path length error signal is exemplified. However, it is enough that the offset giving is performed at least in the optical path length servo loop. For example the offset may be given to the drive signal Dds.

Figure 14:
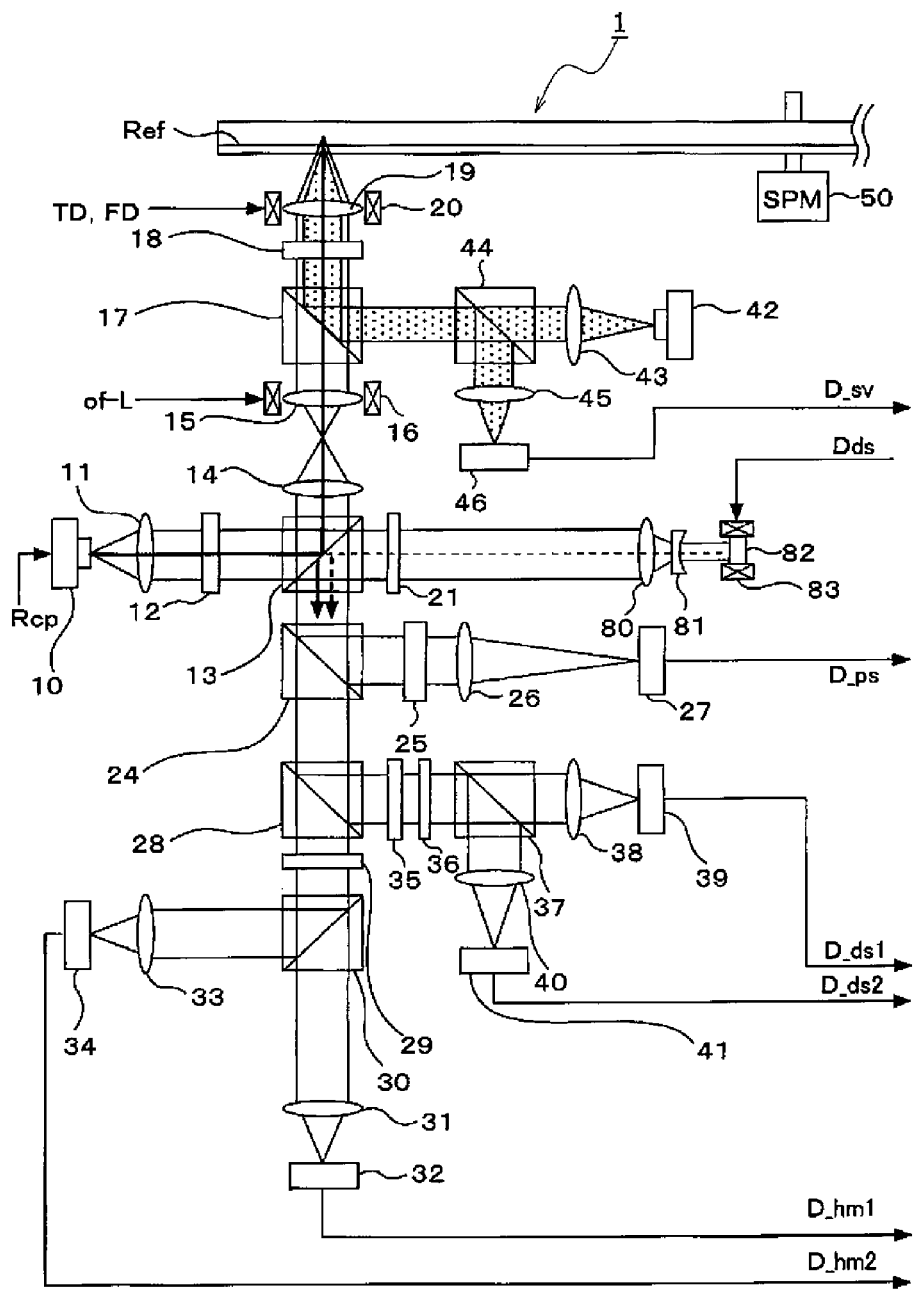
FIG. 14 is a diagram for explaining a modification example about the configuration of a reference light mirror system.

Furthermore, in the reproducing device of an embodiment of the present disclosure, a configuration as a modification example shown in FIG. 14 can also be employed as the configuration of the reference light mirror system.

In FIG. 14, the same part as the part that has been already described is given the same numeral and description thereof is omitted.

In the reproducing device as the modification example shown in FIG. 14, a mirror system including a convex lens 80, a concave lens 81, a mirror 82, and a one-axis actuator 83 is provided instead of the mirror system composed of the mirror 22 and the one-axis actuator 23 in FIG. 2.

By this mirror system as the modification example, the beam diameter of the reference light can be narrowed by the convex lens 80 and the concave lens 81 as shown in the diagram. This allows the mirror 82 to have a size smaller than that of the mirror 22 shown in FIG. 2. Due to this mirror size reduction, the one-axis actuator 83 is capable of higher-speed response compared with the one-axis actuator 23. That is, the amount of imperfection of the servo control can be correspondingly decreased and more stable optical path length servo can be realized.

Furthermore, if the optical path length servo is thus stabilized, the possibility of the occurrence of servo deviation can be correspondingly decreased even when a large offset is given. In other words, the configuration of the mirror system shown in FIG. 14 can increase the upper limit value (absolute value) of the offset that can be given.

In the above description, only the case in which a fixed value is used as the offset given to the optical path length servo loop is exemplified. However, it is also possible that the offset value is variably set depending on e.g. the kind of media.

It is expected that the appropriate value as the offset value that should be given for reduction/enlargement of the RF signal amplitude difference is different depending on the kind of media (the kind of material of the bulk layer 5), the difference in the information recording layer position L, and so forth.

So, the configuration is so made that variable setting of the offset value is permitted so that the corresponding offset value may be given for each of predetermined conditions whose appropriate offset values will differ.

Figure 15:
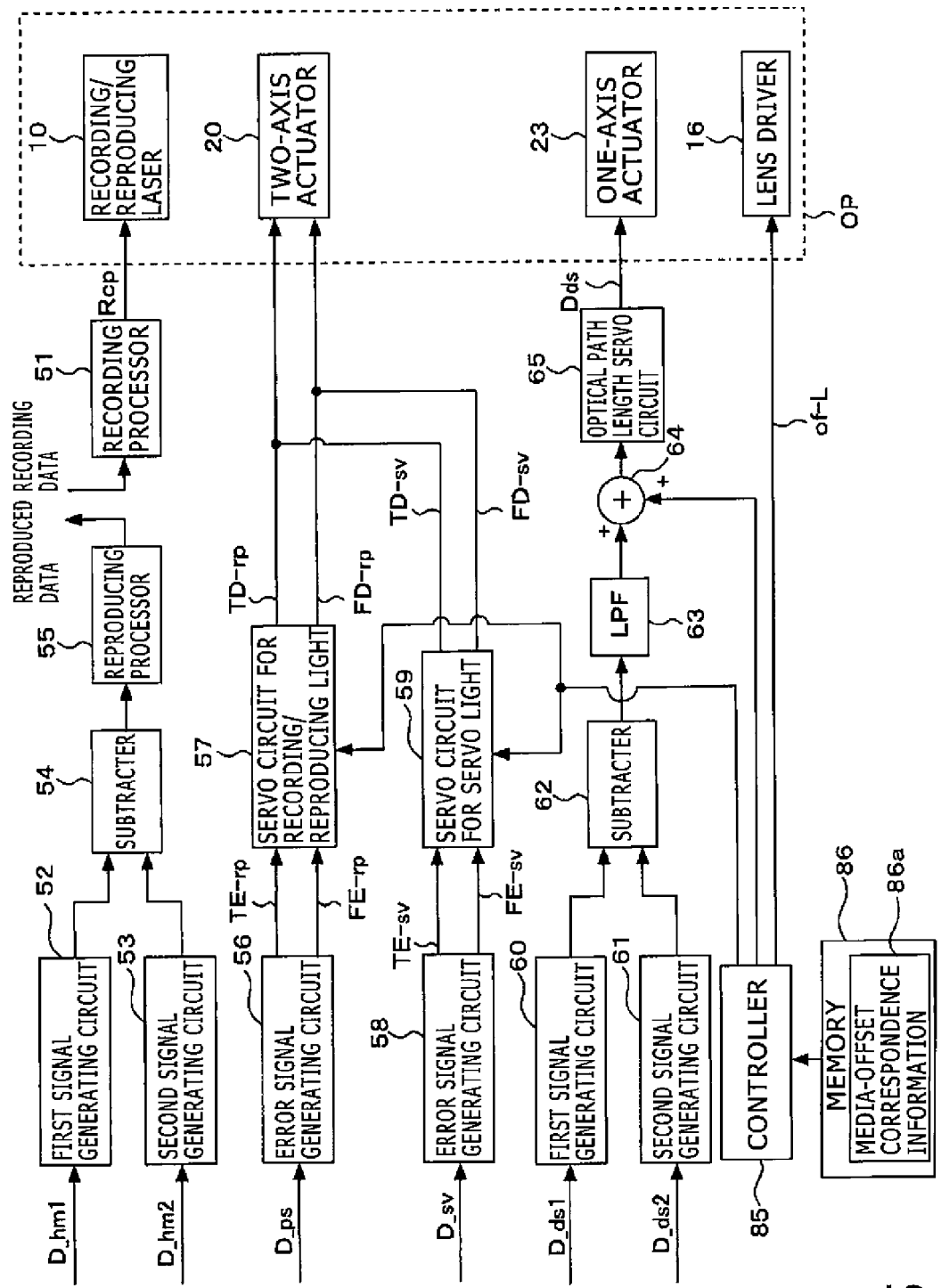
FIG. 15 is a diagram for explaining the configuration of a reproducing device as a modification example in which an offset is variably set.
Figure 16:
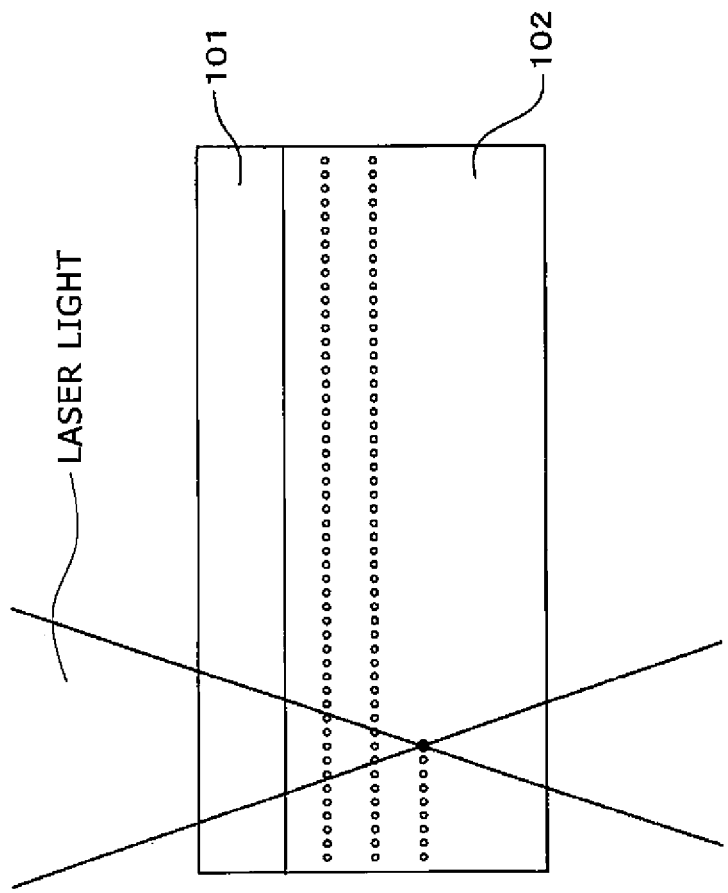
FIG. 16 is a diagram for explaining a bulk recording system.
Figure 17:
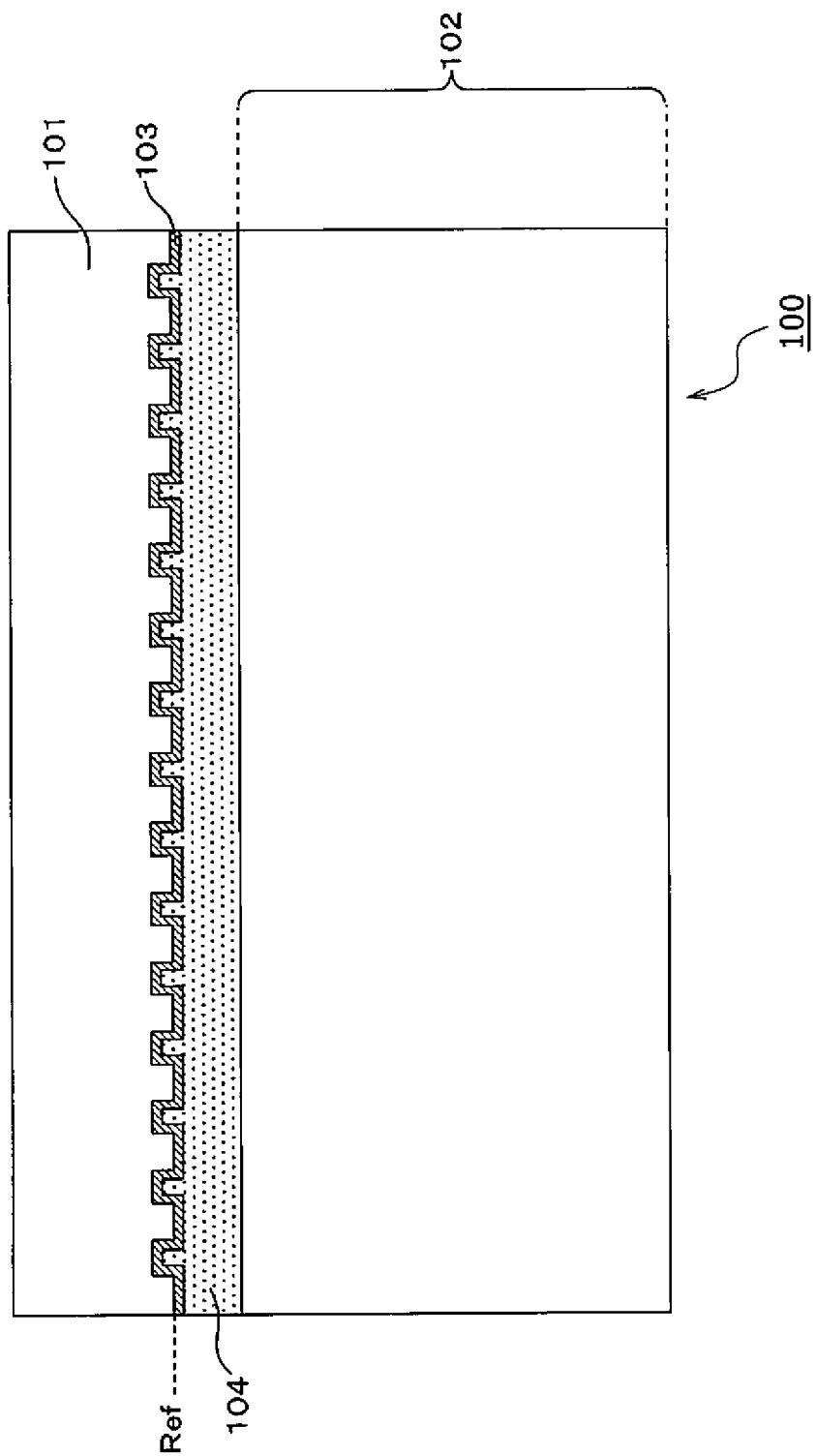
FIG. 17 is a diagram showing the sectional structure of a bulk recording medium.

FIG. 15 is a diagram for explaining the configuration of a reproducing device as a modification example in which the offset value is variably set.

Also in FIG. 15, the part that has been already described is given the same numeral and description thereof is omitted. With FIG. 15, an example of the case in which the difference in the kind of media is treated as one example of the above-described predetermined conditions will be described.

The reproducing device of this case is provided with a memory 86 in which media-offset correspondence information 86a is stored.

The media-offset correspondence information 86a is information in which the appropriate offset value is associated with each of the kinds of media of the bulk recording medium 1. The offset values that should be stored in this media-offset correspondence information 86a for each of the kinds of media are each obtained in advance by a technique similar to that described above for the embodiments.

In this reproducing device, a controller 85 is provided together with the memory 86. This controller 85 is also formed of a microcomputer similarly to the controller 66 and carries out overall control of the reproducing device.

In particular, this controller 85 executes readout of information indicating the kind of media (or information enabling identification of the kind of media: referred to as media-kind identification information collectively) from the bulk recording medium 1 loaded in the reproducing device, and acquires the corresponding offset value (i.e. the offset value corresponding to the kind of media of the loaded bulk recording medium 1) from the media-offset correspondence information 86a based on the contents of this media-kind identification information. Subsequently, the controller 85 gives this acquired offset value to the adder 64.

This allows giving of the appropriate offset value suitable for the kind of media of the loaded bulk recording medium 1 to the optical path length servo loop. As a result, enhancement in the reproduction performance can be achieved irrespective of the kind of media.

Just for the record, the modification example in which the offset value is thus variably set can be applied also to the above-described modification example with the changed mirror system.

Furthermore, although FIG. 15 shows the configuration when this modification example is applied to the reproducing device of the first embodiment, this modification example can be applied also to the second embodiment, in which multi-value recording is performed, of course.

The present application contains subject matter related to that disclosed in Japanese Priority Patent Application JP 2010-211896 filed in the Japan Patent Office on Sep. 22, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A reproducing device comprising:
a homodyne detection part configured to irradiate a recording layer of an optical recording medium with first light via an objective lens and irradiate a mirror with second light, the first light and the second light being obtained by splitting light emitted from a light source, the homodyne detection part carrying out homodyne detection by using reflected light of the first light obtained from the recording layer as signal light and using reflected light of the second light by the mirror as reference light;
a signal reproducing part configured to obtain a reproduced signal based on the signal light, based on a result of homodyne detection by the homodyne detection part;
a one-axis actuator configured to drive the mirror in a direction parallel to an incident optical axis of the second light to the mirror;
an optical path length servo control part configured to carry out driving control of the one-axis actuator in such a manner that an optical path length difference between the signal light and the reference light is kept constant based on a light reception signal by a light receiver that receives the signal light and the reference light; and
an offset giving part configured to give an offset that executes one of reduction and enlargement of an amplitude difference of the reproduced signal of marks that are recorded in the recording layer and have sizes different from each other, to an optical path length servo loop formed in association with servo control by the optical path length servo control part.

2. The reproducing device according to claim 1, further comprising:
a controller configured to carry out control so that the offset given to the optical path length servo loop by the offset giving part be variably set.

3. The reproducing device according to claim 2, wherein the controller carries out control so that the offset depending on the kind of the optical recording medium be set.

4. The reproducing device according to claim 1, further comprising:
a beam diameter reducing part configured to reduce a beam diameter of the second light incident on the mirror.

5. The reproducing device according to claim 1, wherein the homodyne detection part includes
a first light receiver to receive the signal light and the reference light that are so adjusted as to be in phase with each other, and
a second light receiver to receive the signal light and the reference light that is so adjusted as to have a phase difference of 180° with respect to the signal light,
the signal reproducing part is so configured as to obtain the reproduced signal based on a first light reception signal by the first light receiver and a second light reception signal by the second light receiver, and the optical path length servo control part receives a third light reception signal by a third light receiver to receive the signal light that is so adjusted as to have a phase shifted by 90° from a phase of the signal light received by the first light receiver and the reference light that is so adjusted as to be in phase with the adjusted signal light, and a fourth light reception signal by a fourth light receiver to receive the signal light that is so adjusted as to have a phase shifted by 90° from the phase of the signal light received by the first light receiver and the reference light that is so adjusted as to have a phase difference of 180° with respect to the signal light, and the optical path length servo control part carries out driving control of the one-axis actuator in such a manner that a value of a difference between the third light reception signal and the fourth light reception signal is kept constant at zero.

6. The reproducing device according to claim 1, wherein the offset giving part gives an offset toward such a direction as to retard a phase of the reference light as the offset.

7. The reproducing device according to claim 1, wherein the offset giving part gives an offset toward such a direction as to advance a phase of the reference light as the offset.

8. The reproducing device according to claim 1, wherein reproduction is performed about the optical recording medium as a bulk recording medium having a bulk-manner recording layer in which a mark is selectively recorded at a plurality of layer positions set in a depth direction.

9. The reproducing device according to claim 8, wherein reproduction is performed about the optical recording medium in which the mark based on a vacancy is recorded in the recording layer.

10. An optical path length servo control method in a reproducing device including
a homodyne detection part that irradiates a recording layer of an optical recording medium with first light via an objective lens and irradiates a mirror with second light, the first light and the second light being obtained by splitting light emitted from a light source, the homodyne detection part carrying out homodyne detection by using reflected light of the first light obtained from the recording layer as signal light and using reflected light of the second light by the mirror as reference light,
a signal reproducing part that obtains a reproduced signal based on the signal light, based on a result of homodyne detection by the homodyne detection part,
a one-axis actuator that drives the mirror in a direction parallel to an incident optical axis of the second light to the mirror, and
an optical path length servo control part that carries out driving control of the one-axis actuator in such a manner that average amplitude of the reproduced signal is kept constant based on a light reception signal by a light receiver that receives the signal light and the reference light,
the method comprising:
giving an offset that executes one of reduction and enlargement of an amplitude difference of the reproduced signal of marks that are recorded in the recording layer and have sizes different from each other, to an optical path length servo loop formed in association with servo control by the optical path length servo control part.

* * * * *